United States Patent
Krohn et al.

(10) Patent No.: US 7,436,115 B2
(45) Date of Patent: *Oct. 14, 2008

(54) ELECTROLUMINESCENT DEVICE

(76) Inventors: Roy C. Krohn, 3540 Orval Dr., Fort Gratiot, MI (US) 48059; Scott E. Howe, 4871 Fish Rd., Kimball, MI (US) 48074; Christopher C. Ryan, 2594 Evergreen La., Port Huron, MI (US) 48060

( * ) Notice: Subject to any disclaimer, the term of this patent is extended or adjusted under 35 U.S.C. 154(b) by 0 days.

This patent is subject to a terminal disclaimer.

(21) Appl. No.: 11/069,685

(22) Filed: Mar. 1, 2005

(65) Prior Publication Data
US 2005/0179367 A1 Aug. 18, 2005

Related U.S. Application Data

(60) Division of application No. 10/037,697, filed on Nov. 9, 2001, now Pat. No. 6,916,501, which is a continuation-in-part of application No. PCT/US00/41086, filed on Oct. 5, 2000.

(60) Provisional application No. 60/157,944, filed on Oct. 6, 1999.

(51) Int. Cl.
*H01J 1/00* (2006.01)
*H01J 63/02* (2006.01)
*H05B 33/14* (2006.01)
*C08F 4/46* (2006.01)

(52) U.S. Cl. ............... 313/509; 313/483; 313/506; 522/90; 522/96; 522/71; 522/74; 522/75; 522/85; 522/81; 522/179; 522/181; 522/182; 522/113; 522/121; 522/120; 427/66; 427/508; 427/514; 427/519; 428/690; 428/691; 428/914; 428/917

(58) Field of Classification Search .......... 522/90, 522/96, 104, 81, 107, 100, 181, 182, 71, 522/74, 75, 83, 173, 85, 113, 121, 120; 427/66, 427/508, 514, 519, 51; 313/483, 506, 509; 428/690, 691, 914, 917
See application file for complete search history.

(56) References Cited

U.S. PATENT DOCUMENTS

| | | |
|---|---|---|
| 3,700,754 A | 10/1972 | Schmitt et al. |
| 3,953,643 A | 4/1976 | Cheung et al. |
| 3,968,056 A | 7/1976 | Bolon et al. |
| 3,988,647 A | 10/1976 | Bolon et al. |
| 4,049,844 A | 9/1977 | Bolon et al. |
| 4,088,801 A | 5/1978 | Bolon et al. |
| 4,113,894 A | 9/1978 | Koch, II |

(Continued)

FOREIGN PATENT DOCUMENTS

DE 198 35 917 A1 2/2000

(Continued)

*Primary Examiner*—Sanza L McClendon
(74) *Attorney, Agent, or Firm*—Brooks Kushman P.C.

(57) ABSTRACT

The present invention discloses a method for fabricating an electroluminescent lamp that includes a step in which an electroluminescent active layer is formed by curing a UV curable electroluminescent composition. Embodiments of the method of the present invention in which each layer of a multilayer electroluminescent device are fabricated from UV curable compositions are also disclosed. A UV curable dielectric composition suitable for utilization in an electroluminescent lamp is also provided.

20 Claims, 6 Drawing Sheets

U.S. PATENT DOCUMENTS

| | | | |
|---|---|---|---|
| 4,187,340 A | 2/1980 | Oishi et al. | |
| 4,188,449 A | 2/1980 | Lu et al. | |
| RE30,274 E | 5/1980 | Bolon et al. | |
| 4,256,591 A | 3/1981 | Yamamoto et al. | |
| 4,271,212 A | 6/1981 | Stengle | |
| 4,338,376 A | 7/1982 | Kritzler | |
| 4,391,858 A | 7/1983 | Batzill | |
| RE31,411 E | 10/1983 | Bolon et al. | |
| 4,420,500 A | 12/1983 | Nakatani et al. | |
| 4,439,494 A | 3/1984 | Olson | |
| 4,455,205 A | 6/1984 | Olson et al. | |
| 4,472,019 A | 9/1984 | Bishop et al. | |
| 4,478,876 A | 10/1984 | Chung | |
| 4,479,860 A | 10/1984 | Hayase et al. | |
| 4,495,042 A | 1/1985 | Hayase et al. | |
| 4,496,475 A | 1/1985 | Abrams | |
| 4,513,023 A | 4/1985 | Wary | |
| 4,533,445 A | 8/1985 | Orio | |
| 4,539,258 A | 9/1985 | Panush | |
| 4,547,410 A | 10/1985 | Panush et al. | |
| 4,551,361 A | 11/1985 | Burzynski et al. | |
| 4,557,813 A | 12/1985 | Heil et al. | |
| 4,557,975 A | 12/1985 | Moore | |
| 4,559,118 A | 12/1985 | Heil et al. | |
| 4,594,315 A | 6/1986 | Shibue et al. | |
| 4,609,612 A | 9/1986 | Berner et al. | |
| 4,640,981 A | 2/1987 | Dery et al. | |
| 4,665,342 A | 5/1987 | Topp et al. | |
| 4,666,783 A | 5/1987 | Heil et al. | |
| 4,666,821 A | 5/1987 | Hein et al. | |
| 4,684,353 A * | 8/1987 | deSouza | 445/51 |
| 4,738,899 A | 4/1988 | Bluestein et al. | |
| 4,788,108 A | 11/1988 | Saunders, Jr. et al. | |
| D298,917 S | 12/1988 | Krohn | |
| 4,806,257 A | 2/1989 | Clark et al. | |
| 4,814,208 A | 3/1989 | Miyazaki et al. | |
| 4,816,717 A | 3/1989 | Harper et al. | |
| 4,822,646 A | 4/1989 | Clark et al. | |
| 4,828,758 A | 5/1989 | Gillberg-LaForce et al. | |
| 4,877,512 A | 10/1989 | Bowns et al. | |
| 4,900,763 A | 2/1990 | Kraushaar | |
| 4,911,796 A | 3/1990 | Reed | |
| 4,959,178 A | 9/1990 | Frentzel et al. | |
| 4,960,614 A | 10/1990 | Durand | |
| 4,964,948 A | 10/1990 | Reed | |
| 4,975,471 A | 12/1990 | Hayase et al. | |
| 5,006,397 A | 4/1991 | Durand | |
| 5,049,480 A | 9/1991 | Nebe et al. | |
| 5,068,714 A | 11/1991 | Seipler | |
| 5,076,963 A * | 12/1991 | Kameyama et al. | 252/301.36 |
| 5,100,848 A | 3/1992 | Enomoto et al. | |
| 5,104,929 A | 4/1992 | Bilkadi | |
| 5,116,639 A | 5/1992 | Kolk et al. | |
| 5,128,387 A | 7/1992 | Shustack | |
| 5,128,391 A | 7/1992 | Shustack | |
| 5,149,971 A | 9/1992 | McElhaney et al. | |
| 5,180,523 A | 1/1993 | Durand et al. | |
| 5,180,757 A | 1/1993 | Lucey | |
| 5,183,831 A | 2/1993 | Bielat et al. | |
| 5,221,560 A | 6/1993 | Perkins et al. | |
| 5,225,170 A | 7/1993 | Kolk et al. | |
| 5,258,225 A | 11/1993 | Katsamberis | |
| 5,273,774 A * | 12/1993 | Karam et al. | 427/64 |
| 5,282,985 A | 2/1994 | Zabinski et al. | |
| 5,296,295 A | 3/1994 | Perkins et al. | |
| 5,326,636 A | 7/1994 | Durand et al. | |
| 5,356,545 A | 10/1994 | Wayte | |
| 5,384,160 A | 1/1995 | Frazzitta | |
| 5,395,876 A | 3/1995 | Frentzel et al. | |
| 5,424,182 A | 6/1995 | Marginean, Sr. et al. | |
| 5,453,451 A | 9/1995 | Sokol | |
| 5,454,892 A | 10/1995 | Kardon et al. | |
| 5,462,701 A | 10/1995 | Hagemeyer et al. | |
| 5,470,643 A | 11/1995 | Dorfman | |
| 5,470,897 A | 11/1995 | Meixner et al. | |
| 5,514,214 A | 5/1996 | Joel et al. | |
| 5,523,143 A | 6/1996 | Hagemeyer et al. | |
| 5,556,527 A | 9/1996 | Igarashi et al. | |
| 5,561,730 A | 10/1996 | Lochkovic et al. | |
| 5,565,126 A | 10/1996 | Kimura et al. | |
| 5,587,433 A | 12/1996 | Boeckeler | |
| 5,596,024 A | 1/1997 | Horie et al. | |
| 5,609,918 A | 3/1997 | Yamaguchi et al. | |
| 5,624,486 A | 4/1997 | Schmid et al. | |
| 5,633,037 A | 5/1997 | Mayer | |
| 5,686,792 A | 11/1997 | Ensign, Jr. | |
| 5,691,417 A | 11/1997 | Bremer et al. | |
| 5,698,310 A | 12/1997 | Nakamura et al. | |
| 5,716,551 A | 2/1998 | Unruh et al. | |
| 5,718,950 A | 2/1998 | Komatsu et al. | |
| 5,747,115 A | 5/1998 | Howell et al. | |
| 5,750,186 A | 5/1998 | Frazzitta | |
| 5,773,487 A | 6/1998 | Sokol | |
| 5,784,197 A | 7/1998 | Frey et al. | |
| 5,787,218 A | 7/1998 | Ohtaka et al. | |
| 5,833,724 A | 11/1998 | Wei et al. | |
| 5,837,745 A | 11/1998 | Safta et al. | |
| 5,844,362 A * | 12/1998 | Tanabe et al. | 313/506 |
| 5,866,628 A | 2/1999 | Likavec et al. | |
| 5,871,827 A | 2/1999 | Jaffe et al. | |
| 5,883,148 A | 3/1999 | Lewandowski et al. | |
| 5,888,119 A | 3/1999 | Christianson et al. | |
| 5,914,162 A | 6/1999 | Bilkadi | |
| 5,922,481 A * | 7/1999 | Etzbach et al. | 428/690 |
| 5,942,284 A | 8/1999 | Hiskes et al. | |
| 5,945,502 A | 8/1999 | Hsieh et al. | |
| 5,950,808 A | 9/1999 | Tanabe et al. | |
| 5,967,613 A * | 10/1999 | McKeever | 297/397 |
| 5,968,996 A | 10/1999 | Sanchez et al. | |
| 5,994,424 A | 11/1999 | Safta et al. | |
| 6,010,742 A * | 1/2000 | Tanabe et al. | 427/66 |
| 6,054,501 A | 4/2000 | Taniguchi et al. | |
| 6,165,386 A | 12/2000 | Endo et al. | |
| 6,211,262 B1 | 4/2001 | Mejiritski et al. | |
| 6,261,645 B1 | 7/2001 | Betz et al. | |
| 6,262,140 B1 | 7/2001 | Savant et al. | |
| 6,267,645 B1 | 7/2001 | Burga et al. | |
| 6,290,881 B1 | 9/2001 | Krohn | |
| 6,444,713 B1 | 9/2002 | Pachl et al. | |
| 6,500,877 B1 | 12/2002 | Krohn | |
| 6,509,389 B1 | 1/2003 | Krohn | |
| 6,606,399 B2 * | 8/2003 | Burrows et al. | 382/124 |
| 6,713,000 B2 | 3/2004 | Krohn | |
| 6,716,893 B2 | 4/2004 | Krohn | |
| 6,767,577 B1 | 7/2004 | Krohn | |
| 6,784,223 B2 | 8/2004 | Krohn | |
| 6,805,917 B1 | 10/2004 | Krohn | |
| 6,897,248 B2 | 5/2005 | Krohn | |
| 6,916,501 B2 * | 7/2005 | Krohn et al. | 427/66 |
| 2001/0008906 A1 | 7/2001 | Chawla | |
| 2001/0050357 A1 | 12/2001 | Krohn | |
| 2003/0017954 A1 | 1/2003 | Krohn | |
| 2003/0022957 A1 | 1/2003 | Krohn | |
| 2003/0044547 A1 | 3/2003 | Krohn | |
| 2003/0045596 A1 | 3/2003 | Krohn | |
| 2003/0053781 A1 | 3/2003 | Fabian | |
| 2003/0069324 A1 | 4/2003 | Sakano et al. | |
| 2003/0082305 A1 | 5/2003 | Krohn | |
| 2003/0119933 A1 | 6/2003 | Krohn | |
| 2003/0162859 A1 | 8/2003 | Krohn | |
| 2004/0005415 A1 | 1/2004 | Krohn | |
| 2004/0106718 A1 | 6/2004 | Krohn | |
| 2004/0167242 A1 | 8/2004 | Krohn | |
| 2005/0008973 A1 | 1/2005 | Krohn | |

| | | | | | | |
|---|---|---|---|---|---|---|
| 2005/0101685 | A1 | 5/2005 | Krohn | JP | 4267097 A | 9/1992 |
| 2005/0101686 | A1 | 5/2005 | Krohn | JP | 5279436 A | 10/1993 |
| | | | | JP | 5311103 A | 11/1993 |
| | | | | JP | 6016721 A | 1/1994 |

FOREIGN PATENT DOCUMENTS

| | | | | | |
|---|---|---|---|---|---|
| EP | 0 081 323 A1 | 6/1983 | WO | WO 9622005 A1 * | 7/1996 |
| EP | 0 540 884 | 10/1992 | WO | WO 97/31051 | 8/1997 |
| EP | 0 530 141 A1 | 3/1993 | WO | WO 97/45458 | 12/1997 |
| EP | 0 567 940 A1 | 11/1993 | WO | WO 98/40171 | 9/1998 |
| EP | 0 711 801 A2 | 5/1996 | WO | WO 98/47954 | 10/1998 |
| EP | 0 820 217 A1 | 1/1998 | WO | WO 98/50317 | 11/1998 |
| GB | 1 550 382 | 8/1979 | WO | WO 00/62586 | 10/2000 |
| JP | 61203108 A | 9/1986 | | | |

* cited by examiner

ELECTROLUMINESCENT DEVICE

CROSS-REFERENCE TO RELATED APPLICATIONS

This is a divisional of U.S. application Ser. No. 10/037,697 filed Nov. 9, 2001, now U.S. Pat. No. 6,916,501 which is a continuation-in-part of International Application PCT/US00/41086, with an international filing date of Oct. 5, 2000, published in English under PCT Article 21(2), which claims priority to U.S. Provisional Application Ser. No. 60/157,944, filed on Oct. 6, 1999, which hereby are incorporated by reference.

BACKGROUND OF THE INVENTION

1. Field of the Invention

The present invention relates to a method for making an electroluminescent lamp, and more particularly, to a method for making an electroluminescent lamp wherein the electroluminescent active layer is made by ultraviolet ("UV") light curing.

2. Background Art

A typical electroluminescent lamp is a multilayer thin film structure that emits visible light when activated by an applied voltage. Such electroluminescent lamps have found utility in a number of different applications, such as, backlighting for cell phones, backlighting for hand held personal organizers, lighting for point of purchase displays, and backlighting for automotive dash boards.

The active layer (hereafter referred to as the "electroluminescent active layer") is the layer in an electroluminescent lamp which actually emits the light produced by such a device. The electroluminescent active layer will often contain a phosphor. This electroluminescent active layer has previously been deposited by applying various curable compositions to a substrate. However, the compositions typically contain organic solvents that do not incorporate into the electroluminescent active layer after curing. Such solvent-based systems are undesirable because of the hazards and expenses associated with volatile organic solvents. Furthermore, these solvent-containing compositions often produce layers marred by defects and decreased film quality.

In a typical electroluminescent lamp, the active layer comprises one layer of a multilayer electroluminescent device. An example of such a device would contain a substrate made of polycarbonate or glass coated with a transparent conductor such as fluorine doped tin oxide or indium tin oxide. Metallic grid lines are patterned onto the substrate. The active layer is then applied by screen printing the electroluminescent composition onto the substrate with gridlines. A dielectric coating is then optionally applied over the structure. Finally, the device is coated with a metallic backing. The active layer in such electroluminescent devices typically contains a phosphor. Such various oxide or nitride phosphors may or may not be encapsulated with silica. Encapsulation protects the phosphor from deleterious environmental effects.

Electroluminescent lamps in addition to the electroluminescent active layer often include an opaque conductive layer, a dielectric layer, and a transparent conductive layer. Typically, such layers have been made by a number of thin film processes, which include, chemical vapor deposition, thermal curing, sputtering, thermal dip coating, and evaporation. Fabrication of an electroluminescent lamp where each layer is fabricated by a single type of process is desirable.

Many thin layers, such as the electroluminescent active layer used in an electroluminescent lamp, are often made from compositions that are cured by heat. These heat curable compositions require the use of organic solvents that contain a significant amount of volatile organic compounds (VOCs). These VOCs escape into the atmosphere while the heat curable composition dries. Such solvent-based systems are undesirable because of the hazards and expenses associated with VOCs. The hazards include water and air pollution and the expenses include the cost of complying with strict government regulation on solvent emission levels. In contrast, UV curable compositions contain reactive monomers instead of solvents, thus eliminating the detrimental effects of the VOCs.

The use of heat curable compositions not only raises environmental concerns but other disadvantages exist with their use as well. Heat curable compositions suffer from slow cure times that lead to decreased productivity. These compositions require high energy for curing due to energy loss as well as the energy required to heat the substrate. Additionally, many heat curable compositions yield poor film properties that result in decreased value of the end product.

UV curing is an alternative to heat curing. UV curable compositions are typically applied to a substrate through spraying, screen printing, dipping or brushing for the protection or decoration of the substrate. In the usual application, a substrate such as metals, glass, or plastics is coated with the composition and then UV light is introduced to complete the curing process. The UV curable compositions offer many advantages over typical heat curable compositions.

SUMMARY OF THE INVENTION

It is an object of the present invention to provide an improved method for forming an electroluminescent lamp wherein the electroluminescent active layer is formed by UV curing.

It is another object of the present invention to provide an improved method for forming a multilayer electroluminescent lamp wherein each layer is formed by UV curing.

It is still another object of the present invention to provide an improved dielectric composition that is capable of being used in an electroluminescent lamp.

It is yet another object of the present invention to provide an improved UV curable dielectric composition useful for forming a dielectric layer wherein the dielectric composition does not contain any significant amount of volatile organic solvents that do not become incorporated in the dielectric layer after the dielectric composition is cured The present invention discloses a method for forming an electroluminescent lamp on a substrate. The method of the present invention includes a sequence of steps in which an electroluminescent active layer is formed from a UV curable electroluminescent composition. This sequence of steps comprises:

a) applying an electroluminescent composition wherein the electroluminescent composition has the characteristic of being curable into an electroluminescent active layer when irradiated with UV light; and b) curing the electroluminescent composition with UV light for a sufficient time to form the electroluminescent active layer.

The electroluminescent composition does not contain any significant amount of volatile organic solvents that do not become incorporated in the electroluminescent active layer after curing. Specifically, the electroluminescent composition contains 5% or less volatile, and preferably zero, organic solvents by weight. It is an advantage of the present invention that the deposition of a dielectric layer in an electroluminescent device is optional when the disclosed electroluminescent composition is used to deposit the electroluminescent active layer.

In an embodiment of the present invention a method for making an electroluminescent lamp that includes an electroluminescent active layer is provided. The method comprises:
  a) applying a first conductive layer to a substrate;
  b) applying a light-producing layer to the first conductive layer; and
  c) applying a second conductive layer to the light-producing layer.

The first conductive layer is either an opaque conductive layer or a transparent conductive layer. Similarly, the second conductive layer is also either an opaque conductive layer or a transparent conductive layer. However, the first conductive layer and the second conductive layer are not both opaque conductive layers. The light-producing layer is either an electroluminescent layer or a multilayer construction which includes an electroluminescent layer. The electroluminescent layer is formed by:
  a) applying an electroluminescent composition to a substrate coated with one or more layers wherein the electroluminescent composition has the characteristic of being curable into an electroluminescent active layer when irradiated with UV light; and
  b) curing the electroluminescent composition with UV light for a sufficient time to form the electroluminescent active layer.

The following examples provide preferred configurations for the light-producing layer:
  1. an electroluminescent active layer;
  2. a multilayer construction comprising a dielectric layer and an electroluminescent active layer wherein the dielectric layer is applied to the first conductive layer before the electroluminescent active layer is applied; or
  3. a multilayer construction comprising a dielectric layer and the electroluminescent active layer wherein the electroluminescent active layer is applied to the first conductive layer before the dielectric layer is applied;

In another embodiment of the present invention a method for making an electroluminescent lamp that includes an electroluminescent active layer is provided. The method comprises:
  a) applying an opaque conductive layer to a substrate;
  b) applying an electroluminescent composition to the opaque conductive layer wherein the electroluminescent composition has the characteristic of being curable into an electroluminescent active layer when irradiated with UV light;
  c) curing the electroluminescent composition applied to the opaque conductive layer with UV light for a sufficient time to form the electroluminescent active layer;
  d) applying a dielectric layer to the electroluminescent active layer; and
  e) applying a transparent conductive layer to the dielectric layer.

In another embodiment of the present invention a method for making an electroluminescent lamp that includes an electroluminescent active layer is provided. The method comprises:
  a) applying an opaque conductive layer to a substrate;
  b) applying an electroluminescent composition to the opaque conductive layer wherein the electroluminescent composition has the characteristic of being curable into an electroluminescent active layer when irradiated with UV light;
  c) curing the electroluminescent composition applied to the opaque conductive layer with UV light for a sufficient time to form the electroluminescent active layer; and
  d) applying a transparent conductive layer to the electroluminescent active layer.

In another embodiment of the present invention a method for making an electroluminescent lamp that includes an electroluminescent active layer is provided. The method comprises:
  a) applying a transparent conductive layer to a substrate;
  b) applying an electroluminescent composition to the transparent conductive layer wherein the electroluminescent composition has the characteristic of being curable into an electroluminescent active layer when irradiated with UV light;
  c) curing the electroluminescent composition applied to the transparent conductive layer with UV light for a sufficient time to form the electroluminescent active layer; and
  d) applying an opaque conductive layer to the electroluminescent active layer.

In another embodiment of the present invention a method for making an electroluminescent lamp that includes an electroluminescent active layer is provided. The method comprises:
  a) applying a transparent conductive layer to a substrate;
  b) applying an electroluminescent composition to the transparent conductive layer wherein the electroluminescent composition has the characteristic of being curable into an electroluminescent active layer when irradiated with UV light;
  c) curing the electroluminescent composition applied to the transparent conductive layer with UV light for a sufficient time to form the electroluminescent active layer;
  d) applying a dielectric layer to the electroluminescent active layer; and
  e) applying an opaque conductive layer to the dielectric layer.

In yet another embodiment of the present invention a method for making an electroluminescent lamp that includes an electroluminescent active layer is provided. The method comprises:
  a) applying an opaque conductive layer to a substrate;
  b) applying a dielectric layer to the opaque conductive layer;
  c) applying an electroluminescent composition to the dielectric layer wherein the electroluminescent composition has the characteristic of being curable into an electroluminescent active layer when irradiated with UV light;
  d) curing the electroluminescent composition applied to the conductive layer with UV light for a sufficient time to form the electroluminescent active layer; and
  e) applying a transparent conductive layer to the electroluminescent layer.

In still another embodiment of the present invention a method for making an electroluminescent lamp that includes an electroluminescent active layer is provided. The method comprises:
  a) applying an opaque conductive layer to a substrate;
  b) applying a dielectric layer to the opaque conductive layer;

c) applying an electroluminescent composition to the dielectric layer wherein the electroluminescent composition has the characteristic of being curable into an electroluminescent active layer when irradiated with UV light;

d) curing the electroluminescent composition applied to the dielectric layer with UV light for a sufficient time to form the electroluminescent active layer; and e) applying a transparent conductive layer to the electroluminescent active layer.

In still another embodiment of the present invention, an ultraviolet light curable dielectric composition and method for making such a composition is disclosed. The disclosed composition does not contain any significant amount of volatile organic solvents that do not become incorporated in the dielectric layer after curing. Specifically, the dielectric composition contains 5% or less, and preferably zero, volatile organic solvents by weight.

The dielectric composition comprises a photocurable mixture, a photoinitiator, and dielectric material. The photocurable mixture comprises at least one aliphatic acrylated oligomer, wherein the at least one acrylated oligomer is present in an amount of about 10% to 40% of total weight of the dielectric composition. The photocurable mixture of the dielectric composition preferably further comprises an isobornyl acrylate monomer in an amount of about 5% to 30% of the total weight of the dielectric composition, an optional adhesion promoter in an amount of 1% to 10% of total weight of the dielectric composition, and an optional flow promoting agent in an amount of about 0.1% to 6% of total weight of the dielectric composition. The dielectric composition also includes a photoinitiator in an amount of about 0.5% to 10% of the dielectric composition, and dielectric material in an amount of 30% to 80% of the total weight of the dielectric composition.

In accordance with yet another aspect of the invention, a method is provided for depositing a dielectric coating on a substrate. The method comprises a first step of applying to a substrate the dielectric composition set forth above. The method also includes a second step of irradiating the dielectric composition on the substrate with an ultraviolet light to cause the electroluminescent composition to cure into the electroluminescent coating.

In accordance with this method, the dielectric composition can be selectively deposited on the substrate at specific locations where dielectric plating is desired. It need not be applied to the entire substrate.

DETAILED DESCRIPTION OF THE PREFERRED EMBODIMENT(S)

Figure 1:
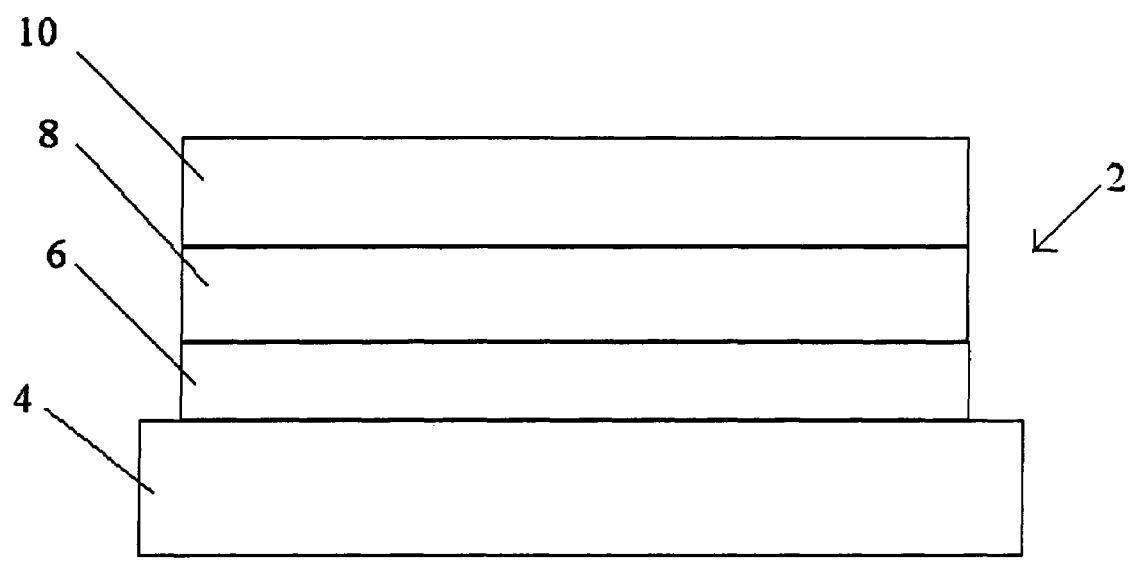
FIG. 1 is a schematic of a preferred three layer electroluminescent lamp made by the method of the present invention.

Reference will now be made in detail to presently preferred compositions or embodiments and methods of the invention, which constitute the best modes of practicing the invention presently known to the inventor.

All percentages of each of the UV curable compositions as expressed in this document refer to the weight percentage of the stated component to the total weight of that particular composition.

The present invention discloses a method for forming an electroluminescent lamp on a substrate. The method of the present invention includes a sequence of steps in which an electroluminescent active layer is formed from a UV curable electroluminescent composition. This sequence of steps comprises:

1) applying an electroluminescent composition to a substrate coated with one or more layers wherein the electroluminescent composition has the characteristic of being curable into an electroluminescent active layer when irradiated with UV light; and 2) curing the electroluminescent composition with UV light for a sufficient time to form the electroluminescent active layer.

In an embodiment of the present invention a method for making an electroluminescent lamp that includes an electroluminescent active layer is provided. The method comprises:

a) applying a first conductive layer to a substrate;

b) applying a light-producing layer to the first conductive layer; and c) applying a second conductive layer to the light-producing layer.

The first conductive layer is either an opaque conductive layer or a transparent conductive layer. Similarly, the second conductive layer is also either an opaque conductive layer or a transparent conductive layer. An opaque conductive layer is a layer which conducts electricity but blocks visible light from passing through. Preferably, an opaque conductive layer will block at least 80% of the visible light. A transparent conductive layer conducts electricity and allows visible light to pass through. Preferably a transparent conductive layer will allow at least 20% of the visible light pass through. The first conductive layer and the second conductive layer cannot both be opaque conductive layers. However, both of these layers may be transparent conductive layers. Furthermore, when the method of the present invention produces a structure with an electroluminescent active layer sandwiched between an opaque conductive layer and a dielectric layer, the dielectric layer preferably will be capable of transmitting at least 20% of the visible that impinges on this layer.

The light-producing layer is either an electroluminescent layer or a multilayer construction which includes an electroluminescent layer. The electroluminescent layer is formed by:

1) applying an electroluminescent composition to a substrate coated with one or more layers wherein the electroluminescent composition has the characteristic of being curable into an electroluminescent active layer when irradiated with UV light; and 2) curing the electroluminescent composition with UV light for a sufficient time to form the electroluminescent active layer.

The following examples provide preferred configurations for the light-producing layer:
1. an electroluminescent active layer;
2. a multilayer construction comprising a dielectric layer and an electroluminescent active layer wherein the dielectric layer is applied to the first conductive layer before the electroluminescent active layer is applied; or
3. a multilayer construction comprising a dielectric layer and the electroluminescent active layer wherein the electroluminescent active layer is applied to the first conductive layer before the dielectric layer is applied;

Finally, the entire electroluminescent lamp of the present invention including the substrate may be optionally coated by the process comprising:
1) applying a clear-coat composition to the electroluminescent active lamp of the present invention wherein the clear-coat composition is capable of being cured into the dielectric coating when irradiated with UV light; and
2) curing the clear-coat composition applied to the electroluminescent lamp with UV light for a sufficient time to form the clear-coat coating.

The only requirement of the clear-coat coating is that it transmits light and be capable of protecting the electroluminescent lamp from environmental degradation. Preferably, the clear-coat layer will transmit at least 20% visible light and more preferably at least 50% visible light. Preferably, the clear-coat layer will be from 0.3 to 5.0 mil thick and more preferably from 0.5 to 1.0 mil thick.

1. Method of Forming the Three Layer Electroluminescent Lamp of FIG. 1.

With reference to FIG. 1, electroluminescent lamp 2 formed on substrate 4 is described. Electroluminescent lamp 2 comprises opaque conductive layer 6, electroluminescent active layer 8, and transparent conductive layer 10. Opaque conductive layer 6 is disposed over substrate 4. Electroluminescent active layer 8 is in turn disposed over opaque conductive layer 6. Finally, transparent conductive layer 10 is disposed over electroluminescent layer 8. In a first particularly preferred embodiment of the present invention, a method for making an electroluminescent lamp illustrated in FIG. 1 is provided. The method comprises:
a) applying an opaque conductive layer to a substrate;
b) applying an electroluminescent composition to the opaque conductive layer wherein the electroluminescent composition has the characteristic of being curable into an electroluminescent active layer when irradiated with UV light;
c) curing the electroluminescent composition applied to the opaque conductive layer with UV light for a sufficient time to form the electroluminescent active layer; and
d) applying a transparent conductive layer to the electroluminescent active layer.

The step of applying an opaque conductive layer to the substrate of this embodiment includes the application of opaque conductive compositions to the substrate that are either thermally curable or photocurable. Preferably the step of applying the opaque conductive layer to the substrate comprises:
a) applying an opaque conductive composition to the substrate wherein the opaque conductive composition is capable of being cured into the opaque conductive layer when irradiated with UV light; and
b) curing the opaque conductive composition applied to the substrate with UV light for a sufficient time to form the opaque conductive layer.

The step of applying a transparent conductive layer to the electroluminescent active layer of this embodiment includes the application of transparent conductive compositions that are either thermally curable or photocurable. The preferred transparent compositions are UV curable. Preferably the step of applying a transparent conductive layer to the electroluminescent active layer comprises:
a) applying a transparent conductive composition to the electroluminescent active layer wherein the conductive composition is capable of being cured into the transparent conductive layer when irradiated with UV light; and
b) curing the transparent conductive composition applied to the electroluminescent active layer with UV light for a sufficient time to form the transparent conductive layer.

2. Method for Forming the Three Layer Electroluminescent Lamp of FIG. 2

Figure 2:
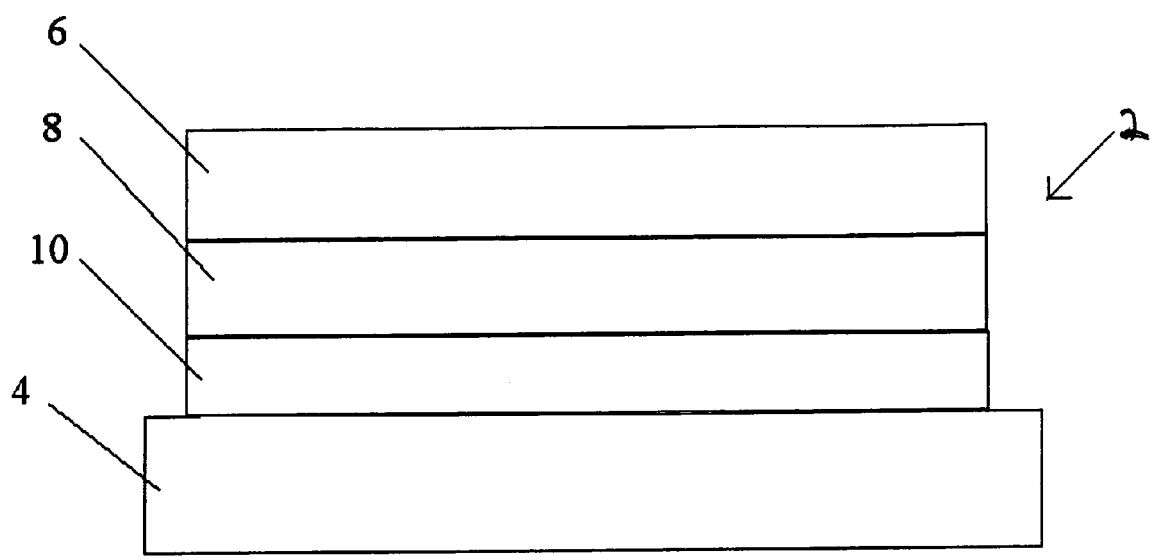
FIG. 2 is a schematic of a preferred three layer electroluminescent lamp made by the method of the present invention.

With reference to FIG. 2, electroluminescent lamp 2 formed on substrate 4 is described. Electroluminescent lamp 2 comprise opaque conductive layer 6, electroluminescent active layer 8, and transparent conductive layer 10. Transparent conductive layer 10 is disposed over substrate 4. Electroluminescent active layer 8 is in turn disposed over transparent conductive layer 10. Finally, Opaque conductive layer 6 is disposed over electroluminescent layer 8. In a second particularly preferred embodiment of the present invention a method for making an electroluminescent lamp illustrated in FIG. 2 is provided. The method comprises:
a) applying a transparent conductive layer to a substrate;
b) applying an electroluminescent composition to the transparent conductive layer wherein the electroluminescent composition has the characteristic of being curable into an electroluminescent active layer when irradiated with UV light;
c) curing the electroluminescent composition applied to the transparent conductive layer with UV light for a sufficient time to form the electroluminescent active layer; and
d) applying an opaque conductive layer to the electroluminescent active layer.

The step of applying a transparent conductive layer to a substrate of this embodiment includes the application of transparent conductive compositions that are either thermally curable or photocurable. The preferred transparent compositions are UV curable. Preferably the step of applying a transparent conductive layer to a substrate comprises:
a) applying a transparent conductive composition to a substrate wherein the conductive composition is capable of being cured into the transparent conductive layer when irradiated with UV light; and
b) curing the transparent conductive composition applied to the substrate with UV light for a sufficient time to form the transparent conductive layer.

The step of applying an opaque conductive layer to the electroluminescent active layer of this embodiment includes the application of opaque conductive compositions that are either thermally curable or photocurable. The preferred opaque conductive compositions are UV curable. Preferably the step of applying the opaque conductive layer comprises:
a) applying an opaque conductive composition to the electroluminescent active layer wherein the opaque conductive composition is capable of being cured into the opaque conductive layer when irradiated with UV light; and b) curing the opaque conductive composition applied to the electroluminescent active layer with UV light for a sufficient time to form the opaque conductive layer.

3. Method for Forming the Four Layer Electroluminescent Lamp of FIG. 3

Figure 3:
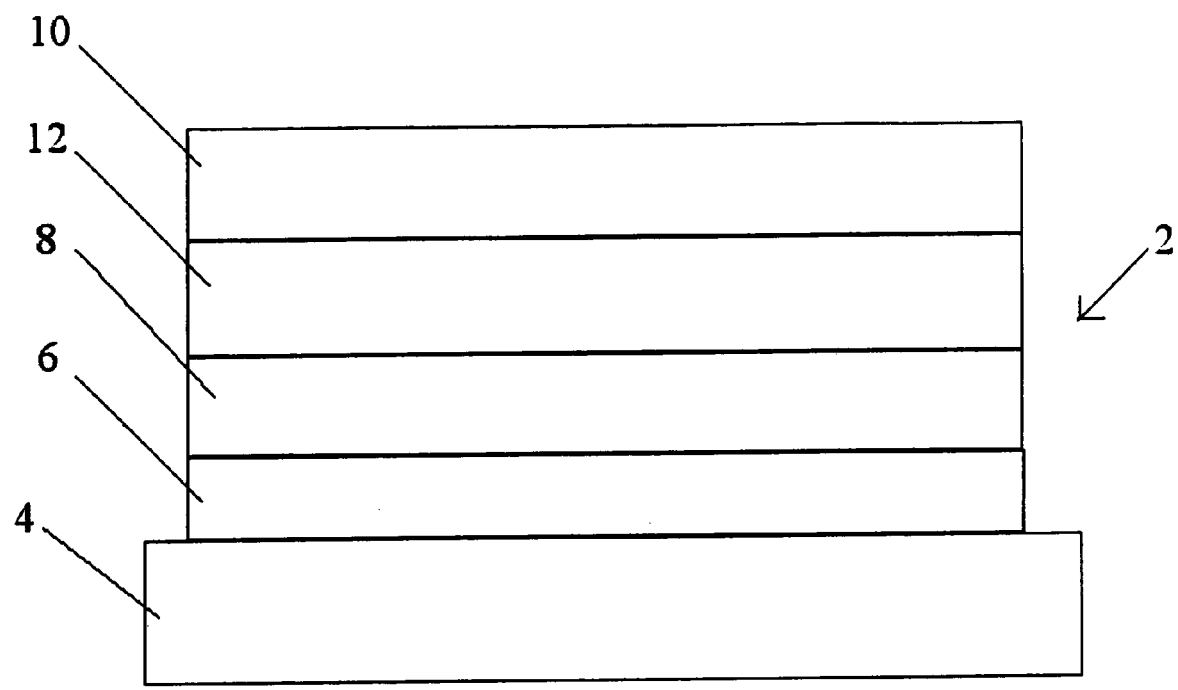
FIG. 3 is a schematic of a preferred four layer electroluminescent lamp made by the method of the present invention.

With reference to FIG. 3, electroluminescent lamp 2 formed on substrate 4 is described. Electroluminescent lamp 2 comprise opaque conductive layer 6, electroluminescent active layer 8, dielectric layer 12, and transparent conductive layer 10. Opaque conductive layer 6 is disposed over substrate 4. Electroluminescent active layer 8 is in turn disposed over opaque conductive layer 6. Dielectric layer 12 is disposed over electroluminescent layer 8. Finally, transparent conductive layer 10 is disposed over dielectric layer 12. In another embodiment of the present invention a method for making an electroluminescent lamp illustrated in FIG. 3 is provided. The method comprises:

a) applying an opaque conductive layer to a substrate;
b) applying an electroluminescent composition to the opaque conductive layer wherein the electroluminescent composition has the characteristic of being curable into an electroluminescent active layer when irradiated with UV light;
c) curing the electroluminescent composition applied to the opaque conductive layer with UV light for a sufficient time to form the electroluminescent active layer;
d) applying a dielectric layer to the electroluminescent active layer; and
e) applying a transparent conductive layer to the dielectric layer.

The step of applying an opaque conductive layer to a substrate of this embodiment includes the application of opaque conductive compositions to the substrate that are either thermally curable or photocurable. The preferred opaque conductive compositions are UV curable. Preferably the step of applying the opaque conductive layer to the substrate comprises:

a) applying an opaque conductive composition to the substrate wherein the opaque conductive composition is capable of being cured into the opaque conductive layer when irradiated with UV light; and
b) curing the opaque conductive composition applied to the substrate with UV light for a sufficient time to form the opaque conductive layer.

The step of applying a dielectric layer to the electroluminescent active layer of this embodiment includes the application of dielectric compositions that are either thermally curable or photocurable. The preferred electroluminescent compositions are UV curable. Preferably the step of applying a dielectric layer to the electroluminescent active layer comprises:

a) applying a dielectric composition to the electroluminescent active layer wherein the dielectric composition is capable of being cured into the dielectric layer when irradiated with UV light; and
b) curing the dielectric composition applied to the electroluminescent layer with UV light for a sufficient time to form the dielectric layer.

The step of applying a transparent conductive layer to the dielectric layer of this embodiment includes the application of transparent conductive compositions that are either thermally curable or photocurable. The preferred transparent compositions are UV curable. Preferably the step of applying a transparent conductive layer to the dielectric layer comprises:

a) applying a transparent conductive composition to the dielectric layer wherein the conductive composition is capable of being cured into the transparent conductive layer when irradiated with UV light; and
b) curing the transparent conductive composition applied to the dielectric layer with UV light for a sufficient time to form the transparent conductive layer.

4. Method for Forming the Four Layer Electroluminescent Lamp of FIG. 4.

Figure 4:
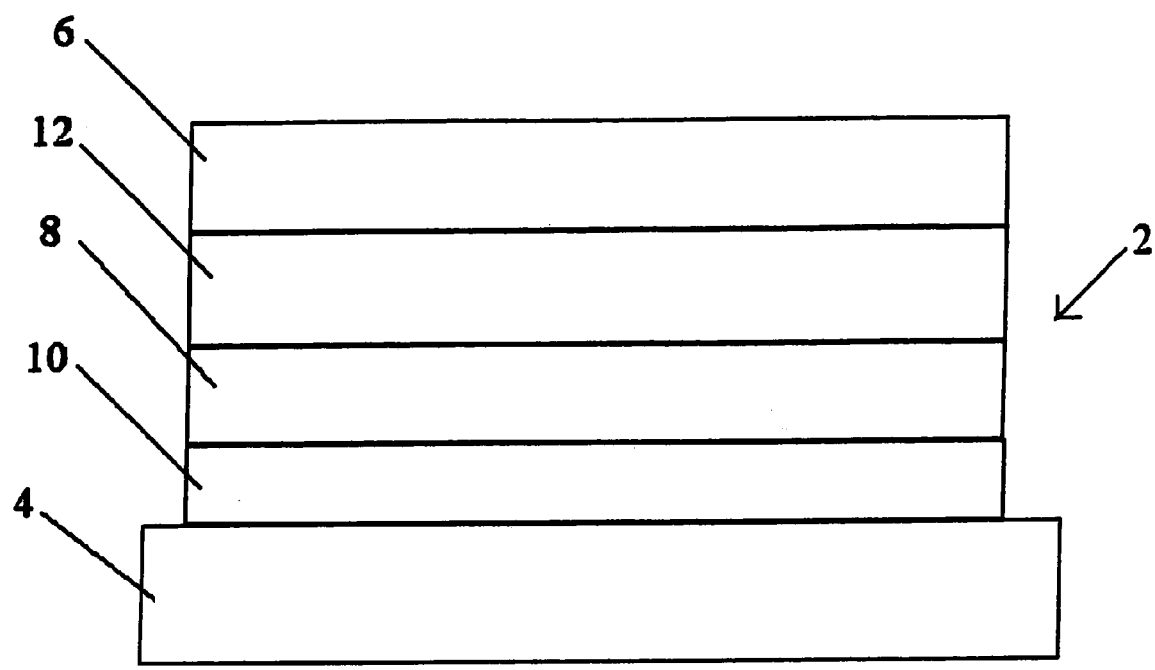
FIG. 4 is a schematic of a preferred four layer electroluminescent lamp made by the method of the present invention.

With reference to FIG. 4, electroluminescent lamp 2 formed on substrate 4 is described. Electroluminescent lamp 2 comprises transparent conductive layer 10, electroluminescent active layer 8, dielectric layer 12, and opaque conductive layer 6. Transparent conductive layer 10 is disposed over substrate 4. Electroluminescent active layer 8 is in turn disposed over transparent conductive layer 10. Dielectric layer 12 is disposed over electroluminescent layer 8. Finally, Opaque conductive layer 6 is disposed over dielectric layer 12. In another embodiment of the present invention, a method for forming an electroluminescent lamp illustrated in FIG. 4 is provided. The method of this embodiment comprises:

a) applying a transparent conductive layer to a substrate;
b) applying an electroluminescent composition to the transparent conductive layer wherein the electroluminescent composition has the characteristic of being curable into an electroluminescent active layer when irradiated with UV light;
c) curing the electroluminescent composition applied to the transparent conductive layer with UV light for a sufficient time to form the electroluminescent active layer;
d) applying a dielectric layer to the electroluminescent active layer; and
e) applying an opaque conductive layer to the dielectric layer.

The step of applying a transparent conductive layer to the substrate of this embodiment includes the application of transparent conductive compositions that are either thermally curable or photocurable. The preferred transparent conductive compositions are UV curable. Preferably the step of applying a transparent conductive layer of this embodiment comprises:

a) applying a transparent conductive composition to substrate wherein the conductive composition is capable of being cured into the transparent conductive layer when irradiated with UV light; and
b) curing the transparent conductive composition applied to the substrate with UV light for a sufficient time to form the transparent conductive layer.

The step of applying a dielectric layer to the electroluminescent active layer of this embodiment includes the application of dielectric compositions that are either thermally curable or photocurable. The preferred electroluminescent compositions are UV curable. Preferably the step of applying a dielectric layer to the electroluminescent active layer of this embodiment comprises:

a) applying a dielectric composition to the electroluminescent active layer wherein the dielectric composition is capable of being cured into the dielectric layer when irradiated with UV light; and
b) curing the dielectric composition applied to the electroluminescent layer with UV light for a sufficient time to form the dielectric layer.

The step of applying an opaque conductive layer to the electroluminescent active layer of this embodiment includes the application of opaque conductive compositions to the substrate that are either thermally curable or photocurable. The preferred opaque conductive compositions are UV curable and are provided below. Preferably the step of applying the opaque conductive layer comprises:

a) applying an opaque conductive composition to the electroluminescent active layer wherein the opaque conductive composition is capable of being cured into the conductive layer when irradiated with UV light; and
b) curing the opaque conductive composition applied to the electroluminescent active layer with UV light for a sufficient time to form the opaque conductive layer.

5. Method for Forming the Four Layer Electroluminescent Lamp of FIG. 5.

Figure 5:
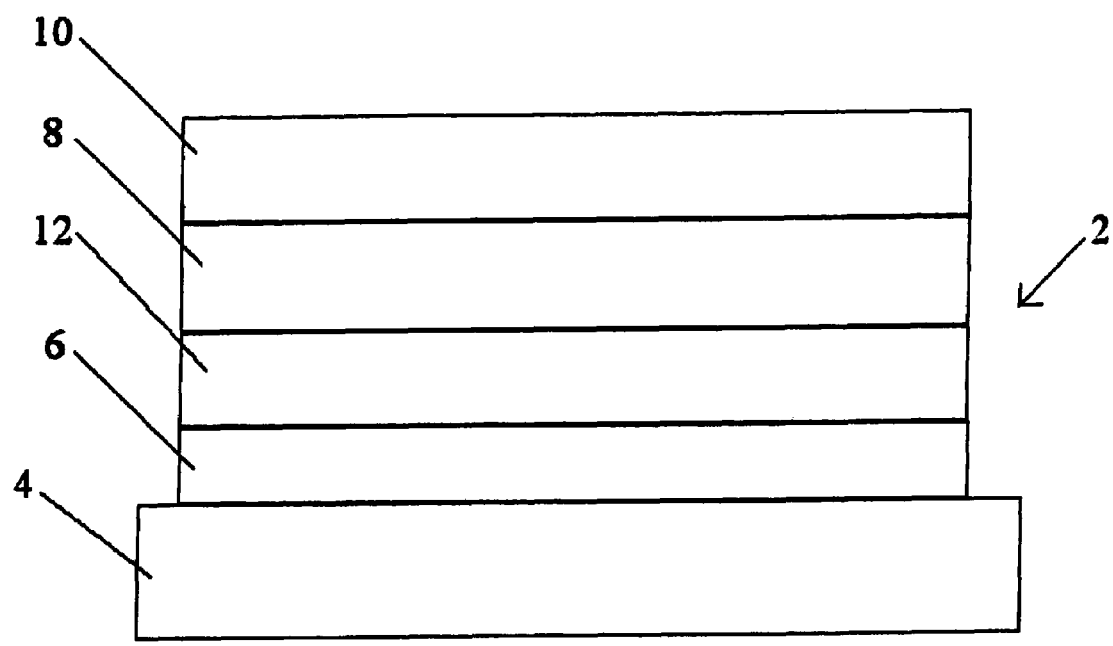
FIG. 5 is a schematic of a preferred four layer electroluminescent lamp made by the method of the present invention.

With reference to FIG. 5, electroluminescent lamp 2 formed on substrate 4 is described. Electroluminescent lamp 2 comprise opaque conductive layer 6, dielectric layer 12, electroluminescent active layer 8, and transparent conductive layer 10. Opaque conductive layer 6 is disposed over substrate 4. Dielectric layer 12 is in turn disposed over opaque conductive layer 6. Electroluminescent active layer 8 is disposed over dielectric layer 12. Finally, transparent conductive layer 10 is disposed over electroluminescent active layer 8. In yet another embodiment of the present invention, a method for forming an electroluminescent lamp illustrated in FIG. 5 is provided. The method of this embodiment comprises:

a) applying an opaque conductive layer to a substrate;
b) applying a dielectric layer to the opaque conductive layer;
c) applying an electroluminescent composition to the dielectric layer wherein the electroluminescent composition has the characteristic of being curable into an electroluminescent active layer when irradiated with UV light;
d) curing the electroluminescent composition applied to the dielectric layer with UV light for a sufficient time to form the electroluminescent active layer; and
e) applying a transparent conductive layer to the electroluminescent active layer.

The step of applying an opaque conductive layer to the substrate of this embodiment includes the application of conductive compositions to the substrate that are either thermally curable or photocurable. The preferred conductive compositions are UV curable. Preferably the step of applying the conductive layer to the substrate of this embodiment comprises:

a) applying a opaque conductive composition to the substrate wherein the opaque conductive composition is capable of being cured into the conductive layer when irradiated with UV light; and
b) curing the opaque conductive composition applied to the substrate with UV light for a sufficient time to form the conductive layer.

The step of applying a dielectric layer to the opaque conductive layer of this embodiment includes the application of dielectric compositions that are either thermally curable or photocurable. The preferred electroluminescent compositions are UV curable. Preferably the step of applying a dielectric layer of this embodiment comprises:

a) applying a dielectric composition to the opaque conductive layer wherein the dielectric composition is capable of being cured into the dielectric layer when irradiated with UV light; and
b) curing the dielectric composition applied to the opaque conductive layer with UV light for a sufficient time to form the dielectric layer.

The step of applying a transparent conductive layer to the electroluminescent active layer of this embodiment includes the application of transparent conductive compositions that are either thermally curable or photocurable. The preferred transparent conductive compositions are UV curable and provided. Preferably the step of applying a transparent conductive layer to the electroluminescent active layer of this embodiment comprises:

a) applying a transparent conductive composition to the electroluminescent active layer wherein the conductive composition is capable of being cured into the second conductive layer when irradiated with UV light; and
b) curing the transparent conductive composition applied to the electroluminescent active layer with UV light for a sufficient time to form the second conductive layer.

6. Method for Forming the Four Layer Electroluminescent Lamp of FIG. 6.

Figure 6:
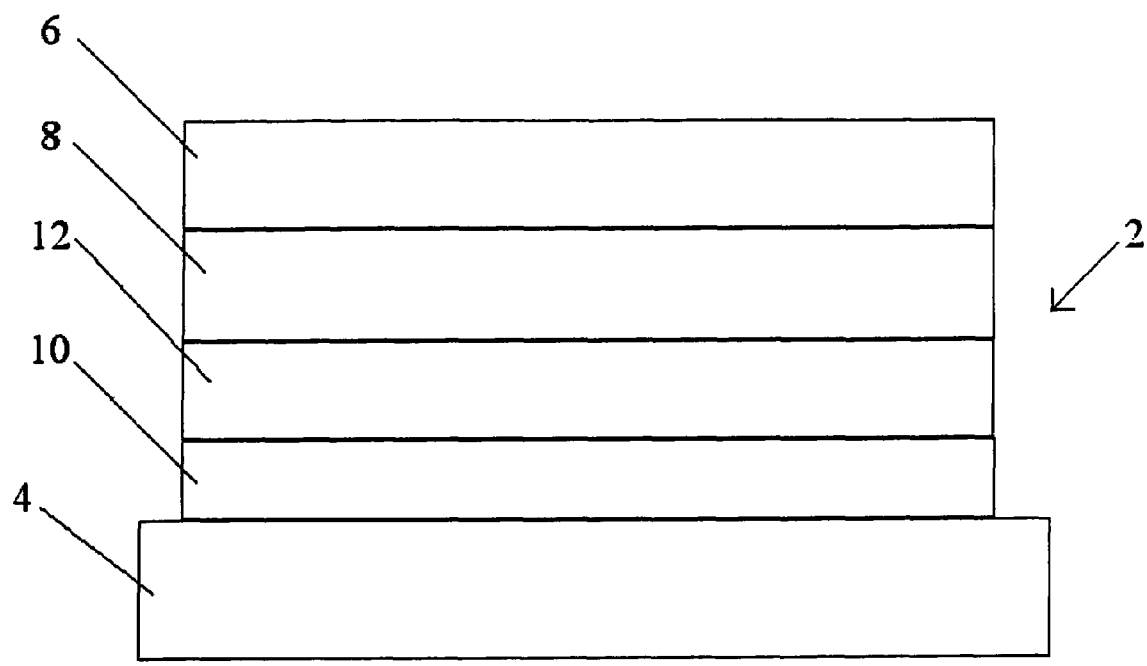
FIG. 6 is a schematic of a preferred four layer electroluminescent lamp made by the method of the present invention.

With reference to FIG. 6, electroluminescent lamp 2 formed on substrate 4 is described. Electroluminescent lamp 2 comprise transparent conductive layer 10, electroluminescent active layer 8, dielectric layer 12, and opaque conductive layer 6. Transparent conductive layer 10 is disposed over substrate 4. Dielectric layer 12 is in turn disposed over transparent conductive layer 10. Electroluminescent active layer 8 is disposed over dielectric layer 12. Finally, opaque conductive layer 6 is disposed over electroluminescent active layer 8. In still another embodiment of the present invention, a method for forming an electroluminescent lamp on a substrate is provided. The method of this embodiment comprises:

a) applying a transparent conductive layer to a substrate;
b) applying a dielectric layer to the transparent conductive layer;
c) applying an electroluminescent composition to the dielectric layer wherein the electroluminescent composition has the characteristic of being curable into an electroluminescent active layer when irradiated with UV light;
d) curing the electroluminescent composition applied to the conductive layer with UV light for a sufficient time to form the electroluminescent active layer; and
e) applying an opaque conductive layer to the electroluminescent active layer.

The step of applying a transparent conductive layer to the substrate of this embodiment includes the application of transparent conductive compositions that are either thermally curable or photocurable. The preferred transparent conductive compositions are UV curable. Preferably the step of applying a transparent conductive layer to the substrate of this embodiment comprises:

a) applying a transparent conductive composition to the substrate wherein the conductive composition is capable of being cured into the second conductive layer when irradiated with UV light; and
b) curing the transparent conductive composition applied to the substrate with UV light for a sufficient time to form the second conductive layer.

The step of applying a dielectric layer to the transparent conductive layer of this embodiment includes the application of dielectric compositions that are either thermally curable or photocurable. The preferred electroluminescent compositions are UV curable. Preferably the step of applying a dielectric layer to the transparent conductive layer of this embodiment comprises:

a) applying a dielectric composition to the transparent conductive layer wherein the dielectric composition is capable of being cured into the dielectric layer when irradiated with UV light; and b) curing the dielectric composition applied to the transparent conductive layer with UV light for a sufficient time to form the dielectric layer.

The step of applying an opaque conductive layer to the electroluminescent active layer of this embodiment includes the application of conductive compositions to the electroluminescent active layer that are either thermally curable or photocurable. The preferred conductive compositions are UV curable. Preferably the step of applying an opaque conductive layer to the electroluminescent active layer of this embodiment comprises:

a) applying an opaque conductive composition to the electroluminescent active layer wherein the opaque conductive composition is capable of being cured into the opaque conductive layer when irradiated with UV light; and b) curing the opaque conductive composition applied to the electroluminescent active layer with UV light for a sufficient time to form the opaque conductive layer.

Preferred substrates for forming the electroluminescent lamp by the various embodiments of the present invention include but are not limited to polyester, cardboard, epoxy coated metal, urethane coated metal, indium tin oxide (ITO) sputtered polyester, fabric, and coated. It will be recognized by those skilled in the art that the method of the present invention can be applied to a number of different substrates.

Preferred UV curable compositions for forming the electroluminescent active layer, the opaque conductive layer, the transparent conductive layer, the dielectric layer, and the clear-coat layer are disclosed below. The preferred transparent conductive compositions have been disclosed in International Patent Application, WO0151567 A1, filed Jan. 11, 2001, and published Jul. 19, 2001, hereby incorporated by reference. The preferred transparent conductive compositions have been disclosed in U.S. Pat. No. 6,290,881, hereby incorporated by reference. Preferred clear-coat compositions have been disclosed as the woodcoat compositions in International Patent Application, WO0151533 A1, filed Jan. 11, 2001, and published Jul. 19, 2001, hereby incorporated by reference. Each of the preferred UV curable compositions do not contain any significant amount of volatile organic solvents that do not become incorporated in the formed layer after curing. Specifically, each composition contains 5% or less volatile organic solvents by weight. Furthermore, each of these UV curable compositions may be applied to the substrate using a number of different techniques. The compositions may be applied, for example, by direct brush application, or it may be sprayed onto the substrate surface. It also may be applied using a screen printing technique. In such screen printing technique, a "screen" as the term is used in the screen printing industry is used to regulate the flow of liquid composition onto the substrate surface. The compositions typically would be applied to the screen as the latter contacts the substrate. The composition flows through the silk screen to the substrate, whereupon it adheres to the substrate at the desired film thickness. Screen printing techniques suitable for this purpose include known techniques, but wherein the process is adjusted in ways known to persons of ordinary skill in the art to accommodate the viscosity, flowability, and other properties of the liquid-phase composition, the substrate and its surface properties, etc. Flexographic techniques, for example, using pinch rollers to contact the electroluminescent composition with a rolling substrate, also may be used.

The thickness of the various layers of the electroluminescent lamp is adjusted by varying the amounts of the specific UV curable composition which is applied. Preferably, the thickness of the opaque conductive layer is from 0.3 to 1.5 mil and more preferably from 0.3 to 1.0 mil thick. The thickness of the dielectric layer is preferably from 0.3 to 2.5 mil and more preferably from 0.3 to 1.0 mil. The thickness of the electroluminescent active layer is preferably from 0.3 to 2.5 mil and more preferably from 1.0 to 2.0 mil. Finally, the thickness of the transparent conductive layer is from 0.3 to 1.5 mil and more preferably from 0.5 to 1.0 mil.

The UV curable compositions are cured by exposure to UV radiation. This illumination may be carried out in any number of ways known to one skilled in the art, provided the ultraviolet light or radiation impinges upon the UV curable composition so that the composition is caused to polymerize to form the coating, layer, film, etc., and thereby cures.

Various ultraviolet light sources may be used and will be known to one skilled in the art, depending on the application. Preferred ultraviolet radiation sources for a number of applications include known ultraviolet lighting equipment with energy intensity settings of, for example, 125 watts, 200 watts, and 300 watts per square inch. Preferably the UV curable compositions used in the present invention will be cured within 0.5 to 10 seconds of curing time, more preferably within 1.0 to 5 seconds, and most preferably about 2 seconds.

Compositions for Forming the Electroluminescent Active Layer

The electroluminescent active layer is preferably formed by applying an electroluminescent composition to a substrate followed by curing with UV light. The electroluminescent composition comprises an electroluminescent phosphor, a photocurable mixture, and a photoinitiator.

The electroluminescent phosphor is preferably a copper activated zinc sulfide or nitride phosphor. The copper activated zinc sulfide phosphor is preferably present in an amount of about 28% to 80% of the electroluminescent composition. The copper activated zinc sulfide or nitride phosphor may either be encapsulated or unencapsulated. In one particularly preferred embodiment of the present composition the copper activated zinc sulfide or nitride phosphor is present in an amount of about 33%. In another particularly preferred embodiment of the present invention, the electroluminescent phosphor is a mixture of an encapsulated and unencapsulated phosphor present in a total amount of about 80% of the weight of the electroluminescent composition wherein the encapsulated phosphor is about 50% of the electroluminescent composition and the unencapsulated phosphor is about 25% of the electroluminescent composition. Suitable encapsulated electroluminescent phosphors include ICEGLO 400, ICEGLO 600, TNE 100, TNE 120, TNE 200 TNE 210, TNE 220, TNE 230, TNE 300, TNE 310, TNE 320, TNE 400, TNE 410 TNE 420, TNE 430, TNE 500, TNE 510, TNE 520, TNE 600, TNE 620, TNE 700, TNE 720, NE 100, NE 120, NE 200, NE 210, NE 220, NE 230, NE 300, NE 310, NE 320, NE 400, NE 410 NE 420, NE 430, NE 500, NE 510, NE520, NE 600, NE 620, NE 700, NE 720, ANE 200, ANE 230, AND 400, and ANE 430 commercially available from Osram Sylvania. Suitable unencapsulated electroluminescent phosphors include 723 EL, 727 EL, 728 EL, 729 EL, 813 EL, and 814 EL commercially available from Osram Sylvania. These materials may emit red, green, yellow, blue or orange colored light based upon the particular phosphor employed. The preferred electroluminescent phosphors are TNE 100, TNE 200, TNE 410, and TNE 700, commercially available from Osram Sylvania.

The photocurable mixture of the electroluminescent composition includes at least one oligomer. The at least one oligomer is preferably present in an amount of about 10% to 40% of the weight of the electroluminescent composition. In a particularly preferred embodiment the at least one oligomer is present in an amount of about 34% of the weight of the electroluminescent composition. In another particularly preferred embodiment the at least one oligomer is present in an amount of about 12% of the weight of the electroluminescent composition. Preferably, the at least one oligomer is selected from the group consisting of an acrylated urethane oligomer, an acrylic oligomer, an epoxy oligomer, a polyester oligomer, and mixtures thereof. More preferably, the at least one oligomer includes an aliphatic acrylated oligomer. Most preferably, the at least one oligomer is a urethane oligomer. Suitable aliphatic acrylated oligomers include Radcure Ebecryl 244 aliphatic urethane diacrylate diluted 10% with 1,6-hexanediol diacrylate), Ebecryl 264 (aliphatic urethane triacrylate diluted 15% with 1,6-hexanediol diacrylate), Ebecryl 284 (aliphatic urethane diacrylate diluted 10% with 1,6-hexanediol diacrylate) commercially available from Radcure UCB Corp. of Smyrna, Ga.; Sartomer CN-961E75 (aliphatic urethane diacrylate blended with 25% ethoxylated trimethylol propane triacrylate), CN-961H81 (aliphatic urethane diacrylate blended with 19% 2(2-ethoxyethoxy)ethyl acrylate), CN-963A80 (aliphatic urethane diacrylate blended with 20% tripropylene glycol diacrylate), CN-964 (aliphatic urethane diacrylate), CN-966A80 (aliphatic urethane diacrylate blended with 20% tripropylene glycol diacrylate), CN-982A75 (aliphatic urethane diacrylate blended with 25% tripropylene glycol diacrylate) and CN-983 (aliphatic urethane diacrylate), commercially available from Sartomer Corp. of Exton, Pa.; TAB FAIRAD 8010, 8179, 8205, 8210, 8216, 8264, M-E-15, UVU-316, commercially available from TAB Chemicals of Chicago, Ill.; and Echo Resin ALU-303, commercially available from Echo Resins of Versaille, Mo.; and Genomer 4652, commercially available from Rahn Radiation Curing of Aurora, Ill. The preferred aliphatic acrylated oligomers include Ebecryl 264 and Ebecryl 284. Ebecryl 264 is an aliphatic urethane triacrylate of 1200 molecular weight supplied as an 85% solution in hexanediol diacrylate. Ebecryl 284 is aliphatic urethane diacrylate of 1200 molecular weight diluted 10% with 1,6-hexanediol diacrylate. Combinations of these materials may also be employed herein.

The photocurable composition of the electroluminescent composition also includes an acrylated monomer which is preferably an isobornyl acrylate. Preferably, the isobornyl acrylate monomer is present in an amount of about 4% to 30% of the electroluminescent composition. In one particularly preferred embodiment of the present invention, the isobornyl acrylate monomer is present in an amount of about 20% of the electroluminescent composition. In another particularly preferred embodiment of the present invention, the isobornyl acrylate monomer is present in an amount of about 8% of the electroluminescent composition. Suitable isobornyl acrylate monomers include Sartomer SR423 (isobornyl methacrylate) and SR506 (isobornyl acrylate) available from Sartomer Corp.; Radcure IBOA (isobornyl acrylate), commercially available from Radcure Corp.; IBOA and IBOMA, commercially available from CPS Chemical of Bradford, England; and Genomer 1121, commercially available from Rahn Radiation Curing. The preferred isobornyl acrylate monomer is Radcure IBOA, commercially available from Radcure Corp. Radcure IBOA is a high purity, low color monomer. Combinations of these materials may also be employed herein.

The preferred photocurable composition of the electroluminescent composition optionally includes an adhesion promoter preferably in an amount of about 1% to 10% the electroluminescent composition. In one particularly preferred embodiment of the present invention the adhesion promoter is present in an amount of about 7%. In another particularly preferred embodiment of the present invention the adhesion promoter is present in an amount of about 3% of the electroluminescent composition. Suitable adhesion promoters include Ebecryl 168 and Ebecryl 170, commercially available from Radcure Corp.; and Sartomer CN 704 (acrylated polyester adhesion promoter) and CD 9052 (trifunctional acid ester), commercially available from Sartomer Corp. The preferred adhesion promoter is Ebecryl 168 which is a methacrylated acidic adhesion promoter. Combinations of these materials may also be employed herein.

The preferred photocurable composition of the electroluminescent composition optionally includes a flow promoting agent preferably in an amount of about 0.1% to 5% of the electroluminescent composition. In one particularly preferred embodiment of the present invention the flow promoting agent is present in an amount of about 3%. In another particularly preferred embodiment of the present invention the flow promoting agent is present in an amount of about 1% of the electroluminescent composition. Suitable flow promoting agents include Genorad 17, commercially available from Rahn Radiation Curing; and Modaflow, commercially available from Monsanto Chemical Co., St. Louis, Mo. The preferred flow promoting agent is Modaflow which is an ethyl acrylate and 2-ethylhexyl acrylate copolymer that improves the flow of the composition. Combinations of these materials may also be employed herein.

The photoinitiator of the electroluminescent composition is preferably in an amount of about 0.5% to 6% of the electroluminescent composition. In one particularly preferred embodiment of the present invention the photoinitiator is present in an amount of about 3%. In another particularly preferred embodiment of the present invention the photoinitiator is present in an amount of about 1% of the electroluminescent composition. Suitable photoinitiators include Iragure 1800, Iragure 1850, Irgacure 184 (1-hydroxycyclohexyl phenyl ketone), Irgacure 907 (2-methyl-1-[4-(methylthio)phenyl]-2-morpholino propan-1-one), Irgacure 369 (2-benzyl-2-N,N-dimethylamino-1-(4-morpholinophenyl)-1-butanone), Irgacure 500(the combination of 50% 1-hydroxy cyclohexyl phenyl ketone and 50% benzophenone), Irgacure 651 (2,2-dimethoxy-1,2-diphenylethan-1-one), Irgacure 1700 (the combination of 25% bis(2,6-dimethoxybenzoyl-2,4-,4-trimethyl pentyl) phosphine oxide and 75% 2-hydroxy-2-methyl-1-phenyl-propan-1-one), and DAROCUR 1173 (2-hydroxy-2-methyl-1phenyl-1-propane), and DAROCUR 4265 (the combination of 50% 2,4,6-trimethylbenzoyldiphenyl-phosphine oxide and 50% 2-hydroxy 2-methyl-1-phenyl-propan-1-one), commercially available from Ciba-Geigy Corp., Tarrytown, N.Y.; CYRACURE UVI-6974 (mixed triaryl sulfonium hexafluoroantimonate salts) and cyracure UVI-6990 (mixed triaryl sulfonium hexafluorophosphate salts) available commercially from Union Carbide Chemicals and Plastics Co. Inc., Danbury, Conn.; and Genocure CQ, Genocure BDK, and Genocure M.F., commercially available from Rahn Radiation Curing. The preferred photoinitiator is Irgacure 1700 commercially available from Ciba-Geigy of Tarrytown, N.Y. Combinations of these materials may also be employed herein.

To illustrate, the following example sets forth a presently preferred electroluminescent composition according to this aspect of the invention.

UV Curable Electroluminescent Composition 1

This example provides an electroluminescent composition that is used to form the electroluminescent active layer. The electroluminescent composition was made from the following components:

| Component | Approximate Weight % |
| --- | --- |
| Ebecryl 264 | 16.7 |
| Ebecryl 284 | 16.7 |
| IBOA | 20.0 |
| Ebecryl 168 | 6.7 |
| Modaflow | 3.3 |
| Irgacure 1700 | 3.3 |
| TNE 200 | 33.3 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, and the Modaflow are introduced into the pan and mixed for 1 to 2 minutes at a speed of 2000 rpm. In the final step, the Ebecryl 168 adhesion promoter and TNE 200 phosphor are introduced into the pan and are mixed for 1 to 2 minutes at a speed of 2000 rpm. The temperature during mixing is monitored. The mixing is temporarily suspended if the temperature exceed 100° F. This particular electroluminescent composition may be used by the method below to produce an active layer that emits bluish-green light.

UV Curable Electroluminescent Composition 2

This example provides an electroluminescent composition that is used to form the electroluminescent active layer. The electroluminescent composition was made from the following components:

| Component | Approximate Weight % |
| --- | --- |
| Ebecryl 264 | 6.3 |
| Ebecryl 284 | 6.3 |
| IBOA | 7.5 |
| Ebecryl 168 | 2.5 |
| Modaflow | 1.3 |
| Irgacure 1700 | 1.3 |
| ANE 430 | 49.8 |
| 813 EL | 25.0 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, and the Modaflow are introduced into the pan and mixed for 1 to 2 minutes at a speed of 2000 rpm. In the final step, the Ebecryl 168 adhesion promoter, ANE 430 phosphor, and 813 EL phosphor are introduced into the pan and are mixed for 1 to 2 minutes at a speed of 2000 rpm. The temperature during mixing is monitored. The mixing is temporarily suspended if the temperature exceed 100° F. This particular electroluminescent composition may be used by the method below to produce an active layer that emits bluish-green light.

Compositions for Forming the Opaque Conductive Layers

In a preferred embodiment of the present invention, the opaque conductive layer is made from a silver composition. The silver composition preferably comprises a photocurable mixture, a silver metal containing mixture, a photoinitiator.

The photocurable mixture of the silver composition preferably comprises an aliphatic acrylated oligomer. The aliphatic acrylated oligomer is present in an amount of about 3% to 8%, and preferably about 8%, of the silver composition. The aliphatic acrylated oligomer preferably comprises a urethane oligomer. Suitable aliphatic acrylated oligomers include the same oligomers enumerated above for the photocurable mixture of the electroluminescent composition.

The photocurable mixture of the silver composition further includes an acrylated epoxy oligomer. The acrylated epoxy oligomer is present in an amount of about 2% to 4%, and preferably about 3%, of the silver composition. Suitable acrylated epoxy oligomers include Radcure Ebecryl 3603, commercially available from Radcure UCB Corp.; Sartomer CN120 and CN124, commercially available from Sartomer Corp.; and Echo Resin TME 9310 and 9345, commercially available from Echo Resins. The preferred acrylated epoxy oligomer is Ebecryl 3603, which tri-functional acrylated epoxy novolac. Combinations of these materials may also be employed herein.

The photocurable mixture of the silver composition preferably further includes an isobornyl acrylate monomer in an amount of about 4% to 8%, and preferably about 5%, of the silver composition. Suitable isobornyl acrylate monomers include the monomer enumerated above for the electroluminescent composition.

The photocurable mixture of the silver composition preferably further includes a flow promoting agent in an amount of about 0.1% to 2%, and preferably about 1.0%, of the silver composition. Suitable flow promoting agents include the same agents enumerated above for the electroluminescent composition.

The silver mixture of the silver composition preferably includes a silver powder in an amount of about 50% to 60%, and preferably about 52%, of the silver composition. The silver powder comprises a plurality of particles. In this preferred silver composition, the silver powder has a particle size range for these particles of about 5 microns to about 15 microns. In some embodiments, the silver powder has a particle size range of about 4.7 microns to about 14.9 microns. Preferably, the silver powder particles have a particle size distribution wherein about 10% of the particles have a particle size of less than about 4.7 microns, about 50% of the particles have a particle size of less than about 7.6 microns, and about 90% of the particles have a particle size of less than about 14.9 microns. The preferred silver powders are Silver Powder EG-ED and Silver Powder C-ED commercially available from Degussa Corp. of South Plainfield, N.J.

The silver powder according to the presently-preferred composition comprises EGED, commercially available from Degussa Corp. of South Plainfield, N.J. Such silver also may be obtained from other commercial sources, e.g., such as Englehard Chemical Co. of Iselin, N.J. The presently preferred silver powder has a grain size distribution ranging from about 5 microns to about 15 microns. This presently preferred silver powder has a particle size distribution as follows:

TABLE 1

| Silver Powder Particle Size Distribution | |
| --- | --- |
| Size Range (microns) | Percentage |
| <4.7 | 10% |
| <7.6 | 50% |
| <14.9 | 90% |

As this table indicates, within a sample of the silver powder, 10% of the grains have a size of less than 4.7 microns, 50% of the grains have a particle size of less than 7.6 microns, and 90% of the grains have a particle size of less than 14.9 microns.

The silver mixture of the silver composition preferably further includes a silver flake composition in an amount of about 25% to 35%, and preferably about 30%, of the silver composition. The silver flake composition comprises a plurality of flakes which comprise, and which preferably consist essentially of, silver. The silver flake composition according to this embodiment has a particle size range of about 5 microns to about 32 microns. More preferably, the silver flake composition has a particle size range of about 5.5 microns to about 32.0 microns. The silver flake particle size distribution preferably is such that about 10% of the particles have a particle size of less than about 5.5 microns, about 50% of the particles have a particle size of less than about 12.5 microns, and about 90% of the particles have a particle size of less than about 32.0 microns. The preferred silver flake compositions are Silver Flake #25, Silver Flake #1, and Silver Flake #7A commercially available from Degussa Corp. of South Plainfield, N.J.

The silver flake according to the presently-preferred composition of Example I comprises SF25, commercially available from Degussa. This silver flake composition preferably has a grain size distribution ranging from about 5 microns to about 32 microns. It has a particle size distribution as follows:

TABLE 2

Silver Flake Composition Particle Size Distribution

| Size Range (microns) | Percentage |
|---|---|
| <5.5 | 10% |
| <12.5 | 50% |
| <32.0 | 90% |

As indicated in Table 2, within a sample of the silver flake, 10% of the flakes have a size of less than 5.5 microns, 50% of the flakes have a particle size of less than 12.5 microns, and 90% of the flakes have a particle size of less than 32.0 microns.

The photoinitiator of the silver composition is preferably present in an amount of about 3% to 6%, and preferably about 4%, of the silver composition. Suitable photoinitiators include the same photoinitiators enumerated above for the electroluminescent compositions.

UV Curable Opaque Conductive Composition 3

This example provides a silver composition that is used to form the opaque conductive layer. The silver composition is made from the following components:

| Component | Approximate Weight % |
|---|---|
| Ebecryl 264 | 7.2 |
| Ebecryl 3603 | 2.4 |
| IBOA | 4.7 |
| Silver Powder EGED | 53.4 |
| Silver Flake # 25 | 27.6 |
| Iragure 1700 | 3.9 |
| Modaflow | 0.8 |
| Total | 100.00 |

In this example the IBOA and Iragure 1700 are mixed in a pan with a propeller blade mixer for 30 seconds at a speed of 500 to 1000 rpm. Next, the Ebecryl 264, the Ebecryl 3603, and the Modaflow are introduced into the pan and mixed for 1 to 2 minutes at a speed of 1000 rpm. In the next step, the EGED silver powder, and the Silver Flake #25 are introduced into the pan and are mixed for 1 to 2 minutes at a speed of 1000 rpm. Finally, the mixing speed is increased to 10,000 rpm and mixed for an additional 5 minutes.

For best results, the silver powder is washed prior to addition to the mixture. The washing process includes a first step of loading the powder in a sealable container. A mixture consisting of 17% methyl ethyl ketone and 83% silver composition is added to the container and the slurry is mixed with a propeller blade for 5 minutes at 500 rpm. The methyl ethyl ketone is poured off and the silver powder is allowed to air dry. During the drying stage the powder is periodically mixed.

UV Curable Opaque Conductive Composition 4

This example provides a silver composition that is used to form the opaque conductive layer. The silver composition is made from the following components:

| Component | Approximate Weight % |
|---|---|
| Ebecryl 264 | 4.2 |
| Ebecryl 3603 | 2.7 |
| IBOA | 7.7 |
| Silver Powder EGED | 53.4 |
| Silver Flake #25 | 27.6 |
| Iragure 1700 | 3.8 |
| Modaflow | 0.6 |
| Total | 100.00 |

In this example the IBOA and Iragure 1700 are mixed in a pan with a propeller blade mixer for 30 seconds at a speed of 500 to 1000 rpm. Next, the Ebecryl 264, the Ebecryl 3603, and the Modaflow are introduced into the pan and mixed for 1 to 2 minutes at a speed of 1000 rpm. In the next step, the EGED silver powder, and the Silver Flake #25 are introduced into the pan and are mixed for 1 to 2 minutes at a speed of 1000 rpm. Finally, the mixing speed is increased to 10,000 rpm and mixed for an additional 5 minutes.

UV Curable Opaque Conductive Composition 5

This example provides a silver composition that is used to form the opaque conductive layer. The silver composition is made from the following components:

| Component | Approximate Weight % |
|---|---|
| Ebecryl 264 | 7.0 |
| Ebecryl 3603 | 2.3 |
| IBOA | 4.6 |
| Silver Powder EGED | 52.3 |
| Silver Flake # 25 | 27.0 |
| Iragure 1700 | 3.8 |
| Modaflow | 0.8 |
| Ebecryl 168 | 2.2 |
| Total | 100.00 |

In this example the IBOA and Iragure 1700 are mixed in a pan with a propeller blade mixer for 30 seconds at a speed of 500 to 1000 rpm. Next, the Ebecryl 264, the Ebecryl 3603, and the Modaflow are introduced into the pan and mixed for 1 to 2 minutes at a speed of 1000 rpm. In the next step, the EGED silver powder, and the Silver Flake #25 are introduced into the pan and are mixed for 1 to 2 minutes at a speed of 1000 rpm. In the next step, the Ebecryl 168 is added into the pan and the combination mixed at 1000 rpm for 1 to 2 minutes. Finally, the mixing speed is increased to 10,000 rpm and mixed for an additional 5 minutes.

This example contains Ebecryl 168 added as an adhesion promoter. This material is a methacrylate ester derivative commercially available from Radcure UCB Corp. of Smyrna, Ga.

Compositions for Forming the Transparent Conductive Layer

In a preferred embodiment of the present invention, the transparent conductive layer is made from a transparent conductive composition. In this preferred embodiment, the transparent conductive composition comprises a photocurable mixture, a conductive powder, and a photoinitiator.

The photocurable mixture of the transparent conductive composition preferably includes a mixture of aliphatic acrylated oligomers. The aliphatic acrylated oligomer mixture is present in an amount of about 10% to 40% of the transparent conductive composition. The aliphatic acrylated oligomer mixture is more preferably present in an amount of about 20% to 30%, and most preferably about 27%. The aliphatic acrylated oligomer preferably comprises one or more urethane oligomers. Suitable aliphatic acrylated oligomers include the same oligomers listed above for the electroluminescent composition.

The photocurable mixture of the transparent conductive composition preferably includes an acrylated epoxy oligomer. The acrylated epoxy oligomer is present in an amount of about 3% to 11%. The acrylated epoxy oligomer is more preferably present in an amount of about 5% to 9%, and most preferably about 7%. Suitable acrylated epoxy oligomers include the same oligomers listed above for the silver composition.

The photocurable mixture of the transparent conductive composition preferably includes an isobornyl acrylate monomer in an amount of about 10% to 40%. The isobornyl acrylate monomer is more preferably present in an amount of about 20% to 35%, and most preferably about 28%. Suitable isobornyl acrylate monomers include the same monomers listed above for the electroluminescent composition.

The photocurable mixture of the transparent conductive composition optionally includes a flow promoting agent in an amount of about 0.1% to 8%. The flow promoting agent is more preferably present in an amount of about 3% to 5%, and most preferably about 3.5%. Suitable flow promoting agents include the same agents listed above for the electroluminescent compositions.

The conductive powder of the present invention is preferably present in an amount of about 20% to 50%. The conductive powder is more preferably present in an amount of about 30% to 40%, and most preferably about 33%. Preferred conductive powders include metal powders, metal oxide powders, and metal nitride powders. Suitable conductive powders include silver powder, tin oxide powder, and indium tin oxide powder. Minatec 30, and Minatec 40. The preferred conductive powders are Minatec 30 and Minatec 40 commercially available from EM Industries located in Hawthorne, N.Y.

This photoinitiator of the transparent conductive composition is preferably present in an amount of about 2% to 10% of the transparent conductive composition. The photoinitiator is more preferably present in an amount of about 4% to 6%, and most preferably about 5%. Suitable photoinitiators include the same photoinitiators enumerated above for the electroluminescent composition.

UV Curable Transparent Conductive Composition 6

This example provides a transparent conductive composition that is used to form the transparent conductive layer. The transparent conductive composition is made from the following components:

| Component | Approximate Weight % |
|---|---|
| Ebecryl 264 | 26.7 |
| IBOA | 28.3 |
| Irgacure 1700 | 5.0 |
| Ebecryl 3603 | 6.6 |
| Modaflow | 3.5 |
| Minatec 30 | 33.4 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 3603, and Modaflow are introduced into the pan and mixed for 1 to 2 minutes at a speed of 2000 rpm. In the final step, the Minatec 30 is added and mixed at 2000 rpm for 1 to 2 minutes. The mixing is temporarily suspended if the temperature exceed 100° F.

UV Curable Transparent Conductive Composition 7

This example provides a transparent conductive composition that is used to form the transparent conductive layer. The transparent conductive composition is made from the following components:

| Component | Approximate Weight % |
|---|---|
| Ebecryl 264 | 26.7 |
| IBOA | 28.3 |
| Irgacure 1700 | 5.0 |
| Ebecryl 3603 | 6.6 |
| Modaflow | 3.5 |
| Minatec 40 | 33.4 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 3603, and Modaflow are introduced into the pan and mixed for 1 to 2 minutes at a speed of 2000 rpm. In the final step, the Minatec 40 is added and mixed at 2000 rpm for 1 to 2 minutes. The mixing is temporarily suspended if the temperature exceed 100° F.

Compositions for Forming the Dielectric Layer

In accordance with one aspect of the invention, a presently preferred ultraviolet light (UV) curable dielectric composition ("dielectric composition") is provided. In this preferred embodiment, the UV curable dielectric composition includes a photocurable mixture, a photoinitiator, and dielectric material.

The photocurable mixture of the UV curable dielectric mixture includes at least one oligomer. The at least one oligomer is present in an amount of about 10% to 40% of the dielectric composition. The at least one oligomer is more preferably present in an amount of about 14% to 30% of the dielectric composition, and most preferably about 20% of the dielectric composition. Preferably, the at least one oligomer is selected from the group consisting of an acrylated urethane oligomer, an acrylic oligomer, an epoxy oligomer, a polyester oligomer, and mixtures thereof. More preferably, the at least one oligomer is an aliphatic acrylated oligomer. Most preferably, the at least one oligomer is a urethane oligomer. Suitable aliphatic acrylated oligomers include Radcure Ebecryl 244, Ebecryl 264 and Ebecryl 284 urethanes, commercially available from Radcure UCB Corp. of Smyrna, Ga.; Sartomer CN961, CN963, CN964, CN 966, CN982 and CN 983, commercially available from Sartomer Corp. of Exton, Pa.; TAB FAIRAD 8010, 8179, 8205, 8210, 8216, 8264, M-E-15, UVU-316, commercially available from TAB Chemicals of Chicago, Ill.; and Echo Resin ALU-303, commercially available from Echo Resins of Versaille, Mo.; and Genomer 4652, commercially available from Rahn Radiation Curing of Aurora, Ill. The preferred aliphatic acrylated oligomers include Ebecryl 264 and Ebecryl 284. Ebecryl 264 is an aliphatic urethane triacrylate supplied as an 85% solution in hexanediol diacrylate. Ebecryl 284 is aliphatic urethane diacrylate of 1200 molecular weight diluted with 1,6-hexanediol diacrylate. Combinations of these materials may also be employed herein.

The photocurable mixture of the UV curable dielectric mixture also includes an isobornyl acrylate monomer in an amount of about 5% to 30% of the dielectric composition. The isobornyl acrylate monomer is more preferably present in an amount of about 8% to 16% of the dielectric composition, and most preferably about 12% of the dielectric composition. Suitable isobornyl acrylate monomers include Sartomer SR423 IBOMA and SR506 IBOA; Radcure IBOA, commercially available from Radcure Corp.; IBOA and IBOMA, commercially available from CPS Chemical; and Genomer 1121, commercially available from Rahn Radiation Curing. The preferred isobornyl acrylate monomers is Radcure IBOA, commercially available from Radcure Corp. Combinations of these materials may also be employed herein.

The photocurable mixture of the UV curable dielectric mixture optionally includes an adhesion promoter in an amount of about 1% to 10% of the dielectric composition. The adhesion promoter is more preferably present in an amount of about 1% to 5% of the dielectric composition, and most preferably about 4% of the dielectric composition. Suitable adhesion promoters include Ebecryl 168, commercially available from Radcure Corp.; and Sartomer CN 704 and CD 9052, commercially available from Sartomer Corp. The preferred adhesion promoter is Ebecryl 168 which is a methacrylated acidic adhesion promoter. Combinations of these materials may also be employed herein.

The photocurable mixture of the UV curable dielectric mixture optionally includes a flow promoting agent in an amount of about 0.1% to 6% of the dielectric composition. The flow promoting agent is more preferably present in an amount of about 1 to 3% of the dielectric composition, and most preferably about 2% of the dielectric composition. Suitable flow promoting agents include Genorad 17, commercially available from Rahn Radiation Curing; and Modaflow, commercially available from Monsanto Chemical Co., St. Louis, Mo. The preferred flow promoting agent is Modaflow which is an ethyl acrylate and 2-ethylhexyl acrylate copolymer that improves the flow of the composition. Combinations of these materials may also be employed herein.

This preferred dielectric composition also includes a photoinitiator in an amount of about 0.5% to 10% of the dielectric composition. The photoinitiator is more preferably present in an amount of about 2% to 6% of the dielectric composition, and most preferably about 4% of the dielectric composition. Suitable photoinitiators include Iragure 819XF, Irgacure 184 (1-hydroxycyclohexyl phenyl ketone), Irgacure 907 (2-methyl-1-[4-(methylthio)phenyl]-2-morpholino propan-1-one), Irgacure 369 (2-benzyl-2-N,N-dimethylamino-1-(4-morpholinophenyl)-1-butanone), Irgacure 500 (the combination of 1-hydroxy cyclohexyl phenyl ketone and benzophenone), 651 (2,2-dimethoxy-2-phenyl acetophenone), Irgacure 1700 (the combination of bis(2,6-dimethoxybenzoyl-2,4-,4-trimethyl pentyl) phosphine oxide and 2-hydroxy-2-methyl-1-phenyl-propan-1-one), Ciba-Geigy 1700, and DAROCUR 1173 (2-hydroxy-2-methyl-1phenyl-1-propane) and 4265 (the combination of 2,4,6trimethylbenzoyldiphenyl-phosphine oxide and 2-hydroxy 2-methyl-1-phenyl-propan-1-one), available commercially from Ciba-Geigy Corp., Tarrytown, N.Y.; CYRACURE UVI-6974 (mixed triaryl sulfonium hexafluoroantimonate salts) and UVI-6990 (mixed triaryl sulfonium hexafluorophosphate salts) available commercially from Union Carbide Chemicals and Plastics Co. Inc., Danbury, Conn.; and Genocure C Q, Genocure B D K, and Genocure M. F., commercially available from Rahn Radiation Curing. The preferred photoinitiators are Irgacure 1700, Iragure 819XF, and Darocur 1173 commercially available from Ciba-Geigy of Tarrytown, N.Y. Combinations of these materials may also be employed herein.

The preferred dielectric composition also includes dielectric material in an amount of about 30% to 80% of the dielectric composition. The dielectric material is more preferably present in an amount of about 40% to 70% of the dielectric composition, and most preferably about 60% of the dielectric composition. Preferably, the dielectric material is an oxide or a mixture of oxides which have a high dielectric constant and high resistivities. Preferred dielectric includes barium titanate (available from GFS Chemical Co.), titanium dioxide(Tint-AYD), zirconium oxide, and the like. Combinations of these materials may also be employed herein.

To illustrate, the following example sets forth a presently preferred dielectric composition according to this aspect of the invention.

UV Curable Dielectric Composition 8

This example provides a preferred dielectric composition according to the invention that can be used for applying a dielectric layer preferably by screen printing techniques. Suitable substrates include glass, metals, and polycarbonate. These substrates are preferably precoated with one or more layers of an electroluminescent lamp. The dielectric composition was made from the following components:

| Component | Approximate Weight % |
|---|---|
| Ebecryl 264 | 9.8 |
| Ebecryl 284 | 9.8 |
| IBOA | 11.8 |
| Ebecryl 168 | 3.8 |
| Modaflow | 2.0 |
| Irgacure 1700 | 3.0 |
| Darocur 1173 | 0.8 |
| Iragure 819XF | 0.2 |
| White preblend - mixture of PC 9003 and IBOA | 24.5 |
| Barium Titanate | 34.3 |
| Total | 100.00 |

In this example, the first step is to prepare the white preblend. The white preblend is a mixture of titanium oxide and IBOA in a weight ratio of 61.5/38.5. PC9003 and the IBOA are mixed in a 61.5/38.5 weight ratio and mixed stirred until smooth to form a first mixture. Mixing is typically accomplished by stirring at 1000-1500 rpm for approximately 5 minutes and then at 2500-3000 for an additional 15 to 20 minutes. The next step is to mix the Iragure 819XF powder into the liquid Darocur 1173 at about 120° F. while stirring at 500-1000 rpm to form a second mixture. Stirring in this second step lasted for about 30 seconds. Next the first and second mixtures are combined and then stirred to form a third mixture. Next, the Ebecryl 264, the Ebecryl 284, the modaflow and the white preblend are added to the third mixture to form a fourth mixture. The fourth mixture is stirred until uniform. Next the barium titanate is added and stirred until uniform to form a sixth mixture. The Ebecryl 168 is then added to the sixth mixture to form the UV curable dielectric.

Clear-Coat Compositions

In a preferred embodiment of the present invention, the clear-coat layer is made from a UV curable clear-coat composition composition. In this preferred embodiment, the clear-coat composition comprises a photocurable mixture and a photoinitiator.

The photocurable mixture of the clear-coat composition includes a at least one aliphatic acrylated oligomer. Preferably, the at least one aliphatic acrylated oligomer is present in an amount of about 10% to 40% of the clear-coat composition. The aliphatic acrylated oligomer mixture is more preferably present in an amount of about 20% to 30% of the clear-coat composition, and most preferably about 24% of the clear-coat composition. The aliphatic acrylated oligomer preferably comprises one or more urethane oligomers. Suitable aliphatic acrylated oligomers include Radcure Ebecryl 244, Ebecryl 264 and Ebecryl 284 urethanes, commercially available from Radcure UCB Corp. of Smyrna, Ga.; Sartomer CN961, CN963, CN964, CN 966, CN982 and CN 983, commercially available from Sartomer Corp. of Exton, Pa.; TAB FAIRAD 8010, 8179, 8205, 8210, 8216, 8264, M-E-15, UVU-316, commercially available from TAB Chemicals of Chicago, Ill.; and Echo Resin ALU-303, commercially available from Echo Resins of Versaille, Mo.; and Genomer 4652, commercially available from Rahn Radiation Curing of Aurora, Ill. The preferred aliphatic acrylated oligomers include Ebecryl 264 and Ebecryl 284. Ebecryl 264 is an aliphatic urethane triacrylate supplied as an 85% solution in hexandiol diacrylate. Ebecryl 284 is aliphatic urethane diacrylate of 1200 molecular weight diluted with 1,6-hexanediol diacrylate. Combinations of these materials may also be employed herein.

The photocurable mixture of the clear-coat composition includes an acrylated epoxy oligomer. The acrylated epoxy oligomer is present in an amount of about 5% to 20% of the clear-coat composition. The acrylated epoxy oligomer is more preferably present in an amount of about 8% to 16% of the clear-coat composition, and most preferably about 12% of the clear-coat composition. Suitable acrylated epoxy oligomers include Radcure Ebecryl 3603, commercially available from Radcure UCB Corp.; Sartomer CN120 and CN124, commercially available from Sartomer Corp.; and Echo Resin TME 9310 and 9345, commercially available from Echo Resins. The preferred acrylated epoxy oligomer is Ebecryl 3603, which tri-functional acrylated epoxy novolac. Combinations of these materials may also be employed herein.

The photocurable mixture of the clear-coat composition also includes an isobornyl acrylate monomer in an amount of about 40% to 60% of the clear-coat composition. The isobornyl acrylate monomer is more preferably present in an amount of about 45% to 55% of the clear-coat composition, and most preferably about 52% of the clear-coat composition. Suitable isobornyl acrylate monomers include Sartomer SR423 IBOMA and SR506 IBOA; Radcure IBOA, commercially available from Radcure Corp.; IBOA and IBOMA, commercially available from CPS Chemical; and Genomer 1121, commercially available from Rahn Radiation Curing. The preferred isobornyl acrylate monomers is Radcure IBOA, commercially available from Radcure Corp. Combinations of these materials may also be employed herein.

The photocurable mixture of the clear-coat composition optionally includes a flow promoting agent in an amount of about 0.1% to 8%, and preferably about 4.5%, of the clear-coat composition. Suitable flow promoting agents include Genorad 17, commercially available from Rahn Radiation Curing; and Modaflow, commercially available from Monsanto Chemical Co., St. Louis, Mo. The preferred flow promoting agent is Modaflow which is an ethyl acrylate and 2-ethylhexyl acrylate copolymer that improves the flow of the composition. Combinations of these materials may also be employed herein.

This preferred clear-coat composition also includes a photoinitiator in an amount of about 4% to 12% of the clear-coat composition. The photoinitiator is more preferably present in an amount of about 6% to 10%, and most preferably about 8%. Suitable photoinitiators include Irgacure 184 (1-hydroxycyclohexyl phenyl ketone), Irgacure 907 (2-methyl-1-[4-(methylthio)phenyl]-2-morpholino propan-1-one), Irgacure 369 (2-benzyl-2-N,N-dimethylamino-1-(4-morpholinophenyl)-1-butanone), Irgacure 500 (the combination of 1-hydroxy cyclohexyl phenyl ketone and benzophenone), 651 (2,2-dimethoxy-2-phenyl acetophenone), Irgacure 1700 (the combination of bis(2,6-dimethoxybenzoyl-2,4-,4-trimethyl pentyl phosphine oxide and 2-hydroxy-2-methyl-1-phenyl-propan-1-one), Ciba-Geigy 1700, and DAROCUR 1173 (2-hydroxy-2-methyl-1phenyl-1-propane) and 4265 (the combination of 2,4,6trimethylbenzoyldiphenyl-phosphine oxide and 2-hydroxy 2-methyl-1-phenyl-propan-1-one), available commercially from Ciba-Geigy Corp., Tarrytown, N.Y.; CYRACURE UVI-6974 (mixed triaryl sulfonium hexafluoroantimonate salts) and UVI-6990 (mixed triaryl sulfonium hexafluorophosphate salts) available commercially from Union Carbide Chemicals and Plastics Co. Inc., Danbury, Conn.; and Genocure CQ, Genocure BDK, and Genocure M.F., commercially available from Rahn Radiation Curing. The preferred photoinitiator is Irgacure 1700 commercially available from Ciba-Geigy of Tarrytown, N.Y. Combinations of these materials may also be employed herein.

To illustrate, the following example sets forth a presently preferred clear-coat composition according to this aspect of the invention.

UV Curable Clear-Coat Composition 9

This example provides a clear-coat composition that is used to form the transparent conductive layer. The clear-coat composition is made from the following components:

| Component | Approximate Weight % |
|---|---|
| Ebecryl 264 | 12.0 |
| Ebecryl 284 | 12.0 |
| IBOA | 51.5 |
| Irgacure 1700 | 8.0 |
| Ebecryl 3603 | 12.0 |
| Modaflow | 4.5 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, the Ebecryl 3603, and Modaflow are introduced into the pan and mixed for 1 to 2 minutes at a speed of 2000 rpm. The mixing is temporarily suspended if the temperature exceed 100° F.

Examples of the Methods of Preparing Electroluminescent Lamps

EXAMPLE 1

UV curable opaque conductive composition 3 described above is applied by screen printing to a plastic sheet substrate. The composition is irradiated with a UV gallium-doped metal halide lamp (curing energy approximately 350 mJ/cm$^2$) lamp for approximately 2 seconds to form an opaque conductive layer on the plastic sheet which is approximately 0.5 mil thick. UV curable electroluminescent composition 1 described above is next screen printed on the conductive layer. The electroluminescent composition is next irradiated with the same lamp for approximately 2 seconds to form an electroluminescent active layer which is approximately 1.5 mil thick. UV curable dielectric composition 8 described above is next screen printed on the electroluminescent layer. The dielectric composition is irradiated with the same UV lamp for approximately 2 seconds to form a dielectric layer which is approximately 0.3 mil thick. The dielectric layer is next over-coated by screen printing with UV curable transparent conductive composition 6 described above. The transparent conductive composition is next irradiated with the same UV lamp to form the transparent conductive layer which is approximately 0.8 mil thick. Finally, the electroluminescent lamp is completed by screen printing the clear-coat composition 9 onto the transparent conductive layer. The clear-coat is then irradiated with the same UV lamp to form the outer protective clear-coat layer which is approximately 0.5 mil thick.

EXAMPLE 2

UV curable transparent conductive composition 6 described above is applied by screen printing to a plastic sheet substrate. The transparent conductive composition is irradiated with a UV gallium-doped metal halide lamp (curing energy approximately 350 mJ/cm$^2$) for approximately 2 seconds to form a transparent conductive layer which is approximately 0.8 mil thick on the plastic sheet. UV curable electroluminescent composition 1 described above is next screen printed on the conductive layer. The electroluminescent composition is next irradiated with the same lamp for approximately 2 seconds to form an electroluminescent active layer which is approximately 1.5 mil thick. UV curable dielectric composition 8 described above is next screen printed on the electroluminescent layer. The dielectric composition is irradiated with the same UV lamp for approximately 2 seconds to form a dielectric layer which is approximately 0.8 mil thick. The dielectric layer is next over-loaded by screen printing with UV curable opaque conductive composition 3 described above. The opaque conductive composition is next irradiated with the same UV lamp to form the opaque conductive layer which is approximately 0.5 mil thick. Finally, the electroluminescent lamp is completed by screen printing the clear-coat composition 9 onto the conductive layer. The clear-coat is then irradiated with the same UV lamp to form the outer protective clear-coat layer which is approximately 0.5 mil thick.

EXAMPLE 3

UV curable conductive composition 3 described above is applied by screen printing to a plastic sheet substrate. The conductive composition is irradiated with a UV gallium-doped metal halide lamp (curing energy approximately 350 mJ/cm$^2$) for approximately 2 seconds to form an opaque conductive layer which is approximately 0.5 mil thick on the plastic sheet. UV curable dielectric composition 8 described above is next screen printed on the conductive layer. The dielectric composition is irradiated with the same UV lamp for approximately 2 seconds to form a dielectric layer which is approximately 0.3 mil thick. UV curable electroluminescent composition 1 described above is next screen printed on the dielectric layer. The electroluminescent composition is next irradiated with the same lamp for approximately 2 seconds to form an electroluminescent active layer which is approximately 1.5 mil thick. The electroluminescent active layer is next over-loaded by screen printing with UV curable transparent conductive composition 6 described above. The transparent conductive composition is next irradiated with the same UV lamp to form the transparent conductive layer which is approximately 0.8 mil thick. Finally, the electroluminescent lamp is completed by screen printing the clear-coat composition 9 onto the transparent conductive layer. The clear-coat is then irradiated with the same UV lamp to form the outer protective clear-coat layer which is approximately 0.5 mil thick.

EXAMPLE 4

UV curable transparent conductive composition 6 described above is applied by screen printing to a plastic sheet substrate. The transparent conductive composition is irradiated with a UV gallium-doped metal halide lamp (curing energy approximately 350 mJ/cm$^2$) for approximately 2 seconds to form a transparent conductive layer which is approximately 0.8 mil thick on the plastic sheet. UV curable dielectric composition 8 described above is next screen printed on the transparent conductive layer. The dielectric composition is irradiated with the same UV lamp for approximately 2 seconds to form a dielectric layer which is approximately 0.8 mil thick. UV curable electroluminescent composition 1 described above is next screen printed on the dielectric layer. The electroluminescent composition is next irradiated with the same lamp for approximately 2 seconds to form an electroluminescent active layer which is approximately 1.5 mil thick. The electroluminescent active layer is next over-loaded by screen printing with UV curable opaque conductive composition 3 described above. The opaque conductive composition is next irradiated with the same UV lamp to form the conductive layer which is approximately 0.5 mil thick. Finally, the electroluminescent lamp is completed by screen printing the clear-coat composition 9 onto the transparent conductive layer. The clear-coat is then irradiated with the same UV lamp to form the outer protective clear-coat layer which is approximately 0.5 mil thick.

EXAMPLE 5

UV curable opaque conductive composition 3 described above is applied by screen printing to a plastic sheet substrate. The composition is irradiated with a UV gallium-doped metal halide lamp (curing energy approximately 350 mJ/cm$^2$) lamp for approximately 2 seconds to form an opaque conductive layer which is approximately 0.5 mil thick on the plastic sheet. UV curable electroluminescent composition 1 described above is next screen printed on the conductive layer. The electroluminescent composition is next irradiated with the same lamp for approximately 2 seconds to form an electroluminescent active layer which is approximately 1.5 mil thick. The electroluminescent active layer is next over-loaded by screen printing with UV curable transparent conductive composition 6 described above which is approximately 0.8 mil thick. The transparent conductive composition is next irradiated with the same UV lamp to form the transparent conductive layer. Finally, the electroluminescent lamp is completed by screen printing the clear-coat composition 9 onto the transparent conductive layer. The clear-coat is then irradiated with the same UV lamp to form the outer protective clear-coat layer which is approximately 0.5 mil thick.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for forming an electrode for an electroluminescent lamp on a substrate, the method comprising:
    a) applying an electroluminescent composition to a conductive layer wherein the electroluminescent composition has the characteristic of being curable into an electroluminescent active layer when illuminated with UV light;
    b) curing the electroluminescent composition applied to the conductive layer with UV light to form the electroluminescent active layer; and
    c) applying a dielectric composition to the electroluminescent layer, the dielectric layer comprising:
    a photocurable organic mixture, the photocurable composition comprising an acrylated aliphatic urethane oligomer;
    dielectric materials; and
    a photoinitiator.

2. The method of claim 1, wherein the dielectric composition further photocurable mixture comprises:
    an isobornyl acrylate monomer.

3. The method of claim 2 wherein the isobornyl acrylate monomer is present in an amount of about 5 % to 30% of the total weight of the dielectric composition.

4. The method of claim 2 wherein the isobornyl acrylate monomer is present in an amount of about 8% to 16% of the total weight of the dielectric composition.

5. The method of claim 1, wherein:
    the acrylated aliphatic urethane oligomer is present in an amount of about 10% to 40% of the total weight of the dielectric composition; and
    the dielectric materials are present in an amount of about 30% to 80% of the total weight of the dielectric composition.

6. The method of claim 1 wherein the photoinitiator is present in an amount of about 0.5 % to 10% of the total weight of the dielectric composition.

7. The method of claim 1 wherein the photoinitiator is present in an amount of about 2% to 6% of the total weight of the dielectric composition.

8. The method of claim 1 wherein the acrylated aliphatic urethane oligomer is present in an amount of about 14% to 30% of the total weight of the dielectric composition.

9. The method of claim 1 wherein the dielectric materials are present in an amount of about 40% to 70% of the total weight of the dielectric composition.

10. The method of claim 1 wherein the dielectric material is a nonconductive metal oxide.

11. The method of claim 1 wherein the dielectric material is selected from the group consisting of titanium oxide, barium titanate, zirconium oxide, and mixtures thereof.

12. The method of claim 1 wherein the photocurable mixture further comprises a flow promoting agent.

13. The method of claim 12 wherein the flow promoting agent is present in an amount of about 0.1% to 6% of the total weight of the dielectric composition.

14. The method of claim 12 wherein the photocurable mixture further comprises an adhesion promoter.

15. The method of claim 14 wherein the adhesion promoter is present in an amount of about 1% to 10% of the total weight of the dielectric composition.

16. The method of claim 1 wherein the acrylated aliphatic urethane oligomer is present in an amount of about 10% to 40% of the total weight of the dielectric composition.

17. The method of claim 1 wherein the dielectric materials are present in an amount of about 30% to 80% of the total weight of the dielectric composition.

18. A method for forming an electrode for an electroluminescent lamp on a substrate, the method comprising:
    a) applying an electroluminescent composition to a conductive layer wherein the electroluminescent composition has the characteristic of being curable into an electroluminescent active layer when illuminated with UV light;
    b) curing the electroluminescent composition applied to the conductive layer with UV light to form the electroluminescent active layer; and
    c) applying a dielectric composition to the electroluminescent layer, the dielectric layer comprising:
    a photocurable organic mixture, the photocurable composition comprising an acrylated aliphatic urethane oligomer present in an amount of about 10% to 40% of the total weight of the dielectric composition;
    an isobornyl acrylate monomer present in an amount of about 5 % to 30% of the total weight of the dielectric composition;
    dielectric materials present in an amount of about 30% to 80% of the total weight of the dielectric composition; and
    a photoinitiator present in an amount of about 0.5 % to 10% of the total weight of the dielectric composition.

19. The method of claim 18, wherein the dielectric material is a nonconductive metal oxide.

20. The method of claim 18, wherein the dielectric material is selected from the group consisting of titanium oxide, barium titanate, zirconium oxide, and mixtures thereof.

* * * * *